(12) United States Patent
Kimura

(10) Patent No.: US 7,373,439 B2
(45) Date of Patent: May 13, 2008

(54) SYSTEM METHOD USING MATERIAL EXCHANGE FORMAT (MXF) CONVERTING PROGRAM FOR AUDIO AND VIDEO DATA FILES HAVING ROUTINES THAT GENERATES ATTRIBUTE DATA FROM AUDIO AND VIDEO DATA FILE

(75) Inventor: Shin Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 10/901,804

(22) Filed: Jul. 29, 2004

(65) Prior Publication Data
US 2005/0076028 A1 Apr. 7, 2005

(30) Foreign Application Priority Data
Jul. 30, 2003 (JP) ............................. 2003-283178
Jul. 30, 2003 (JP) ............................. 2003-283182

(51) Int. Cl.
*G06F 7/00* (2006.01)
*G06F 17/30* (2006.01)

(52) U.S. Cl. ................... 710/62; 710/1; 710/4; 710/33; 725/34; 725/67; 709/246; 709/230; 707/7

(58) Field of Classification Search .................... 710/1, 710/4, 33, 62; 725/34, 67; 709/246, 230; 707/7
See application file for complete search history.

(56) References Cited

U.S. PATENT DOCUMENTS
7,020,888 B2 * 3/2006 Reynolds et al. .............. 725/34

FOREIGN PATENT DOCUMENTS
| JP | 7 319901 | 12/1995 |
| JP | 8 289297 | 11/1996 |
| JP | 2001 195195 | 7/2001 |
| JP | 2001 285795 | 10/2001 |
| JP | 2003 111023 | 4/2003 |
| WO | WO 02/21845 | * 3/2002 |

OTHER PUBLICATIONS
"Material Exchange Format FAQ", 0605341, Pinnacle Systems, pp. 1-4.

* cited by examiner

*Primary Examiner*—Tammara Peyton
(74) *Attorney, Agent, or Firm*—Frommer Lawrence & Haug LLP; William S. Frommer; Thomas F. Presson

(57) ABSTRACT

An MXF parser thread 43 parses data MXF_D, being, mixed together, a plurality of video data PIC, a plurality of audio data SOU, and system data SYS. Then, it generates video file attribute data VFPD concerning the video based on the parsed system data and metadata META and generates video file data VF including the video file attribute data VFPD and the parsed plurality of video data PIC (VIDEO). Further, the audio file data AF is generated too in the same way.

10 Claims, 27 Drawing Sheets

PRG3: EDIT PROCESSING PROGRAM

KLV DATA

VideoCommonInfo VideoFormat ;

VideoCommonInfo Width ;

VideoCommonInfo Height ;

VideoCommonInfo Framesize=frameSize;

VideoCommonInfo Scale;

VideoCommonInfo Rate ;

VideoCommonInfo Scanlineinfo ;

VCPD

WavFormat wFormatTag = WAVE_FORMAT_PCM

WavFormat nChannels

WavFormat nSamplesPerSec

WavFormat nAvgBytesPerSec

WavFormat nBlockAlign

WavFormat wBitsPerSample

WavFormat cbSize

<u>WFPD</u>

FIG. 15A

CASE OF IMX50_625, IMX40_625, IMX30_625

VideoCommonInfo VideoFormat = 2;
VideoCommonInfo Width     = 720;
VideoCommonInfo Height    = 576;
VideoCommonInfo Framesize = frameSize;
VideoCommonInfo Scale     = 1;
VideoCommonInfo Rate      = 25;
VideoCommonInfo Scanlineinfo = 0;

FIG. 15B

CASE OF IMX50_525, IMX40_525, IMX30_525

VideoCommonInfo Videoformat = 2;
VideoCommonInfo Width     = 720;
VideoCommonInfo Height    = 486;
VideoCommonInfo Framesize = frameSize;
VideoCommonInfo Scale     = 1001;
VideoCommonInfo Rate      = 30000;
VideoCommonInfo Scanlineinfo = 1;

FIG. 16

IMX50_625: frameSize = 0x3E000

IMX40_625: frameSize = 0x31000

IMX30_625: frameSize = 0x25000

IMX50_525: frameSize = 0x33000

IMX40_525: frameSize = 0x29000

IMX30_525: frameSize = 0x1F000

FIG. 17

WavFormat wFormatTag = WAVE_FORMAT_PCM

WavFormat nChannels = 1

WavFormat nSamplesPerSec = 48000

WavFormat nAvgBytesPerSec = 2 * 48000

WavFormat nBlockAlign = 2

WavFormat wBitsPerSample = 16

WavFormat cbSize = 0

PIC PARSE ROUTINE

SOU PARSE ROUTINE

MXF MUX THREAD

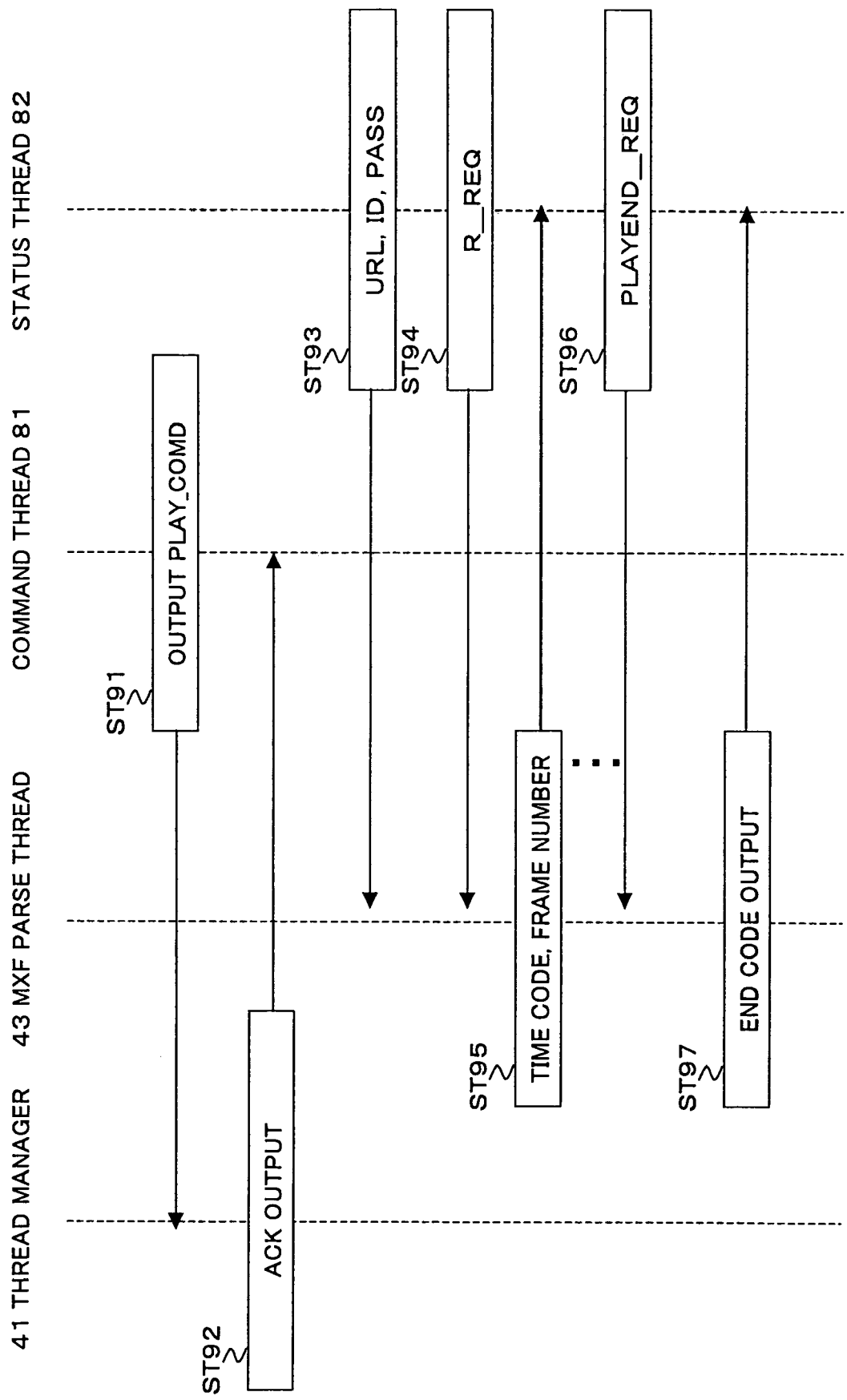

SYSTEM METHOD USING MATERIAL EXCHANGE FORMAT (MXF) CONVERTING PROGRAM FOR AUDIO AND VIDEO DATA FILES HAVING ROUTINES THAT GENERATES ATTRIBUTE DATA FROM AUDIO AND VIDEO DATA FILE

BACKGROUND OF THE INVENTION

1. Field of the Invention

The present invention relates to a program for converting formats of video data and audio data, a data processing method, and a system of the same.

2. Description of the Related Art

One of the file exchange formats of video data and audio data is the "Material Exchange Format (MXF)". The MXF is composed of metadata included in header data and a plurality of frame data etc. Each frame data includes 1 frame's worth of video data, the audio data corresponding to that, system data indicating attributes of the video data and audio data, etc.

Namely, in MXF data, the video data, the audio data, and the system data are stored interleaved together. In the MXF, by describing in the metadata and system data the attributes such as the coding scheme, compression method, data structure, time code, and edit content of the video data and audio data in each frame data, file exchange is enabled with a format not depending upon the attributes of the video data and audio data.

In a PC or other computer, when performing processing to reproduce video data and audio data, it is necessary for the video data and the audio data to exist as separate video file data and audio file data. Due to this, there is the problem that the computer cannot reproduce video data and audio data by MXF data as it is. Further, when performing processing for reproducing video data and audio data input from a process for conversion in synchronization, due to the processing load, sometimes the video data cannot be reproduced at normal speed or more. In this case, there is the problem that the reproduced image and sound cannot be synchronized. Further, there is a demand to automatically generate and transfer data of the MXF based on video file data and audio file data stored by the computer etc.

Further, the computer must perform conversion processing for converting for example MXF data received by FTP to the video data and the audio data. When the conversion processing is carried out after the processing for reception by FTP is terminated, however, there is the problem that the processing time becomes longer. The same problem exists when performing the processing for converting the received data concerning data other than MXF data.

SUMMARY OF THE INVENTION

A first object of the present invention is to provide a program capable of individually generating video file data and audio file data from data storing video data, audio data, and attribute data interleaved, a method of the same, and a system of the same.

A second object of the present invention is to provide a program capable of generating data storing, mixed together, video data, audio data, and attribute data interleaved from the video file data and the audio file data, a method of the same, and a system of the same.

A third object of the present invention is to provide a program capable of shortening a processing time when converting the reception processed data, a method of the same, and a system of the same.

In order to solve the above problems of the related art, according to a first aspect of the invention, there is provided a program comprising a first routine for parsing data to be processed, the data being mixed together, a plurality of video data, a plurality of audio data, and a plurality of first attribute data indicating attributes of the video data and audio data, a second routine for generating a second attribute data concerning the video data based on the first attribute data parsed by the first routine and generating a video file data including the second attribute data and the plurality of video data parsed by the first routine, and a third routine for generating a third attribute data concerning the audio data based on the first attribute data parsed by the first routine and generating audio file data including the third attribute data and the plurality of audio data parsed by the first routine.

According to a second aspect of the invention, there is provided a data processing method comprising a first step of parsing data to be processed, the data being mixed together, a plurality of video data, a plurality of audio data, and a plurality of first attribute data indicating attributes of the video data and audio data, a second step of generating a second attribute data concerning the video data based on the first attribute data parsed in the first step and generating a video file data including the second attribute data and the plurality of video data parsed in the first step, and a third step of generating a third attribute data concerning the audio data based on the first attribute data parsed in the first step and generating audio file data including the third attribute data and the plurality of audio data parsed in the first step.

The mode of operation of the data processing method of the second aspect of the invention is as follows. First, in the first step, the processed data storing, mixed together, a plurality of video data, a plurality of audio data, and a plurality of first attribute data indicating attributes of the video data and the audio data is parsed. Next, in the second step, the second attribute data concerning the video is generated based on the first attribute data parsed in the first step, and the video file data including the second attribute data and the plurality of video data parsed in the first step is generated. Further, in the third step, the third attribute data concerning the audio is generated based on the first attribute data parsed in the first step, and the audio file data including the third attribute data and the plurality of audio data parsed in the first step is generated.

According to a third aspect of the invention, there is provided a data processing system comprising a first means for parsing data to be processed, the data being mixed together, a plurality of video data, a plurality of audio data, and a plurality of first attribute data indicating attributes of the video data and audio data, a second means for generating a second attribute data concerning the video data based on the first attribute data parsed by the first means and generating video file data including the second attribute data and the plurality of video data parsed by the first means, and a third means for generating third attribute data concerning the audio based on the first attribute data parsed by the first means and generating audio file data including the third attribute data and the plurality of audio data parsed in the first means.

The mode of operation of the data processing system of the third aspect of the invention is as follows. First, in the first means, the processed data storing, mixed together, a plurality of video data, a plurality of audio data, and a plurality of first attribute data indicating attributes of the video data and the audio data is parsed. Next, in the second means, the second attribute data concerning the video is generated based on the first attribute data parsed by the first means, and the video file data including the second attribute data and the plurality of video data parsed by the first means is generated. Further, in the third means, the third attribute data concerning the audio is generated based on the first attribute data parsed by the first means, and the audio file data including the third attribute data and the plurality of audio data parsed by the first means is generated.

According to a fourth aspect of the invention, there is provided a program for making a data processing system execute a first routine for specifying a format based on video attribute data included in the video file data and a second routine for generating data composed of a plurality of module data each including module attribute data defined corresponding to each of a plurality of video data included in the video file data and indicating the format specified by the first routine, a single unit of the video data, and a single unit of audio data corresponding to the video data among the plurality of audio data included in the audio file data.

According to a fifth aspect of the invention, there is provided a data processing method comprising a first step of specifying a format based on video attribute data included in the video file data and a second step of generating data composed of a plurality of module data each including module attribute data defined corresponding to each of a plurality of video data included in the video file data and indicating the format specified in the first step, a single unit of the video data, and a single unit of audio data corresponding to the video data among the plurality of audio data included in the audio file data.

The mode of operation of the data processing method of the fifth aspect of the invention is as follows. In the first step, the format is specified based on the video attribute data included in the video file data. Next, in the second step, the data composed of a plurality of module data each including the module attribute data indicating the format defined corresponding to each of the plurality of video data included in the video file data and specified in the first step, a single unit of the video data, and a single unit of the audio data corresponding to the video data among the plurality of audio data included in the audio file data is generated.

According to a sixth aspect of the invention, there is provided a data processing system comprising a first means for specifying a format based on video attribute data included in the video file data and a second means for generating data composed of a plurality of module data each including module attribute data defined corresponding to each of a plurality of video data included in the video file data and indicating the format specified by the first means, a single unit of the video data, and a single unit of audio data corresponding to the video data among the plurality of audio data included in the audio file data.

The mode of operation of the data processing system of the sixth aspect of the invention is as follows. In the first means, the format is specified based on the video attribute data included in the video file data. Next, in the second means, the data composed of a plurality of module data each including module attribute data indicating the format defined corresponding to each of the plurality of video data included in the video file data and specified in the first means, a single unit of the video data, and a single unit of the audio data corresponding to the video data among the plurality of audio data included in the audio file data is generated.

According to a seventh aspect of the invention, there is provided a program for making a data processing system execute a communication process for performing processing for receiving first data and a conversion process for converting the first data passing the reception processing of the communication process to second data in parallel with the processing for reception by the communication process.

The mode of operation of the program of the seventh aspect of the invention is as follows. The program of the seventh aspect of the invention is executed by the data processing system and makes the data processing system execute the communication process. In the communication process, the processing for receiving the first data is carried out. Further, the program of the seventh aspect of the invention makes the data processing system execute the conversion process. The conversion process converts the first data passing the processing for reception of the communication process to second data in parallel with the processing for reception by the communication process.

According to an eighth aspect of the invention, there is provided a data processing method comprising a first step of performing processing for receiving the first data and a second step performed in parallel with the processing for reception by the first step and converting the first data passing the processing for reception in the first step to the second data.

The mode of operation of the data processing method of the eighth aspect of the invention is as follows. In the first step, the processing for receiving the first data is carried out. Further, in the second step, the processing for converting the first data passing the processing for reception in the first step to the second data is carried out in parallel with the processing for reception by the first step.

According to a ninth aspect of the invention, there is provided a data processing system comprising a first means for performing processing for receiving the first data and a second means operating in parallel with the processing for reception by the first means and converting the first data passed the processing for reception of the first means to the second data.

The mode of operation of the data processing system of the ninth aspect of the invention is as follows. The first means performs the processing for receiving the first data. Further, the second means performs the processing for converting the first data passing the processing for reception in the first step to second data in parallel with the processing for reception by the first means.

BRIEF DESCRIPTION OF THE DRAWINGS

These and other objects and features of the present invention will become clearer from the following description of the preferred embodiments given with reference to the attached drawings, wherein:

FIG. 8 is a view for explaining video common property data VCPD shown in FIG. 7;

FIG. 10 is a view for explaining WAVE specifying data WFPD shown in FIG. 9;

FIG. 15 is a view for explaining the processing of step ST5 shown in FIG. 13;

FIG. 16 is a view for explaining the processing of step ST5 shown in FIG. 13;

FIG. 17 is a view for explaining the processing of step ST5 shown in FIG. 13;

FIG. 27 is a view for explaining the request and the data transferred between the MXF parser thread and the reproduction thread in the case shown in FIG. 25.

DESCRIPTION OF THE PREFERRED EMBODIMENTS

Below, an explanation will be given of embodimentS of the present invention. First, an explanation will be given of the correspondence between the configuration of the present invention and the configuration of the present embodiment.

Correspondence with First to Sixth Aspects of Invention

Figure 5:
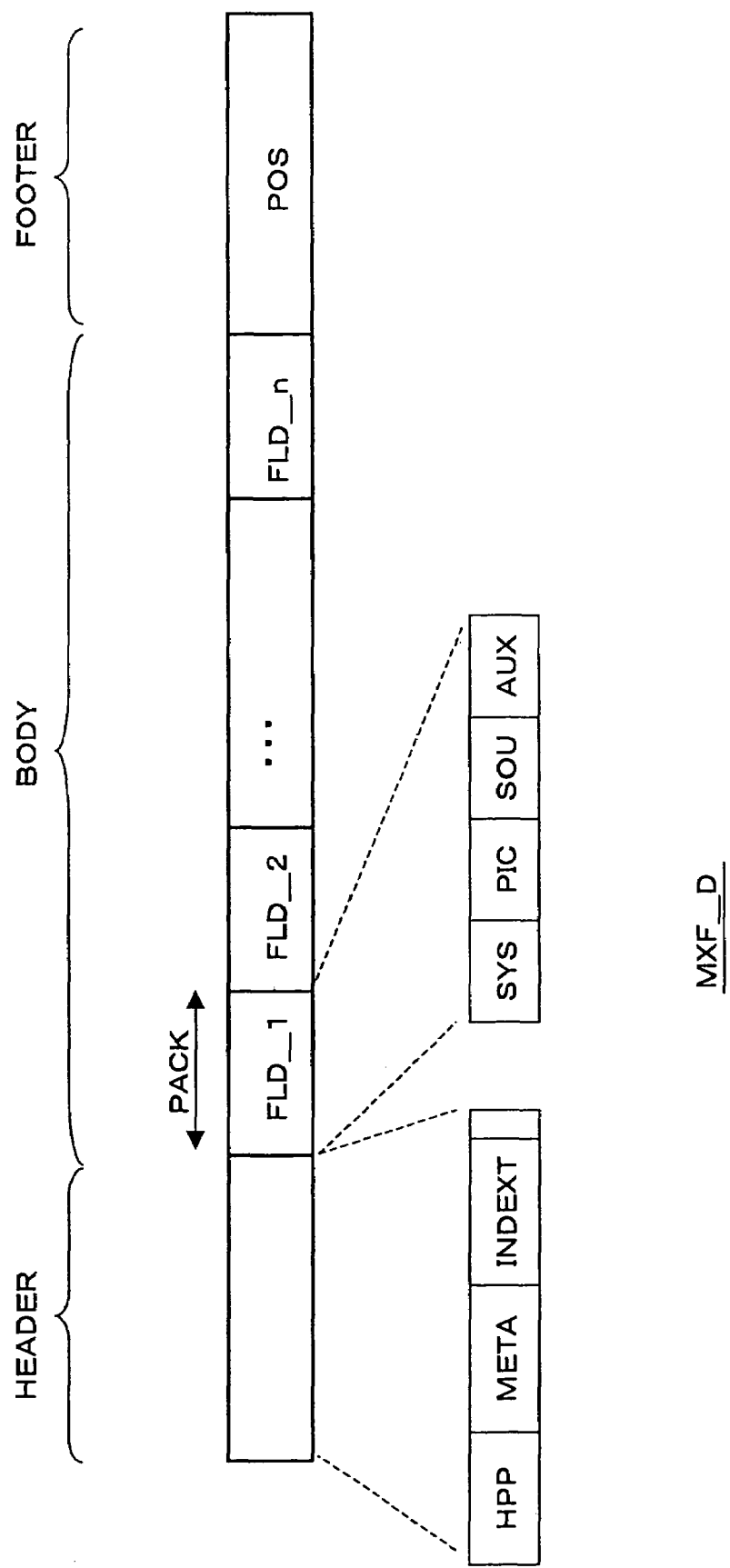
FIG. 5 is a view for explaining data MXF_D.

The data MXF_D shown in FIG. 5 of the present embodiment corresponds to the processed data of the first to third aspects of the aspects of the invention and the data generated by the second routine, the second step, and the second means of the fourth to sixth aspects of the aspects of the invention. The video file data VF shown in FIG. 7 of the present embodiment corresponds to the video file data of the present invention, while the audio file data AF shown in FIG. 9 corresponds to the audio file data of the present invention. The video data PIC shown in FIG. 6 corresponds to the video data in the processed data of the present invention, while the audio data AUDIO corresponds to the audio data in the processed data of the present invention. The video data VIDEO shown in FIG. 7 etc. corresponds to the video data in the video file data of the present invention, while the audio data AUDIO shown in FIG. 9 etc. corresponds to the audio data in the audio file data of the present invention. The system data SYS of the present embodiment corresponds to the first attribute data of the first to third aspects of the invention and the module attribute data of the fourth to sixth aspects of the invention. The video file attribute data VFPD shown in FIG. 7 corresponds to the second attribute data of the first to third aspects of the invention. The audio file attribute data AFPD shown in FIG. 9 corresponds to the third attribute data of the first to third aspects of the invention. The header data HEADER and the metadata META shown in FIG. 5 correspond to the fourth attribute data of the present invention. The KLV data shown in FIG. 6 corresponds to the unit data of the present invention, a key (K) corresponds to an identification data of the present invention, a data length (L) corresponds to a data length data of the present invention, and data (V) corresponds to a data body of the present invention.

An MXF processing program PRG1 of the present embodiment corresponds to programs of the first aspect of the invention and the fourth aspect of the invention. Here, an MXF parser thread 43 activated by the execution of the MXF processing program PRG1 corresponds to the first aspect of the invention, and the MXF parser thread 43 is the portion corresponding to the fourth aspect of the invention. The computer 4 corresponds to the data processing systems of the third aspect of the invention and the sixth aspect of the invention. The first routine of the first aspect invention, the first step of the second aspect of the invention, and the first means of the third aspect of the invention are realized by step ST1 shown in FIG. 13, step ST21 shown in FIG. 18, and step ST31 shown in FIG. 19. The second routine of the first aspect of the invention, the second step of the second aspect of the invention, and the second means of the third aspect of the invention are realized by steps ST5, ST7, and ST10 shown in FIG. 13 and the processing of FIG. 18.

Figure 13:
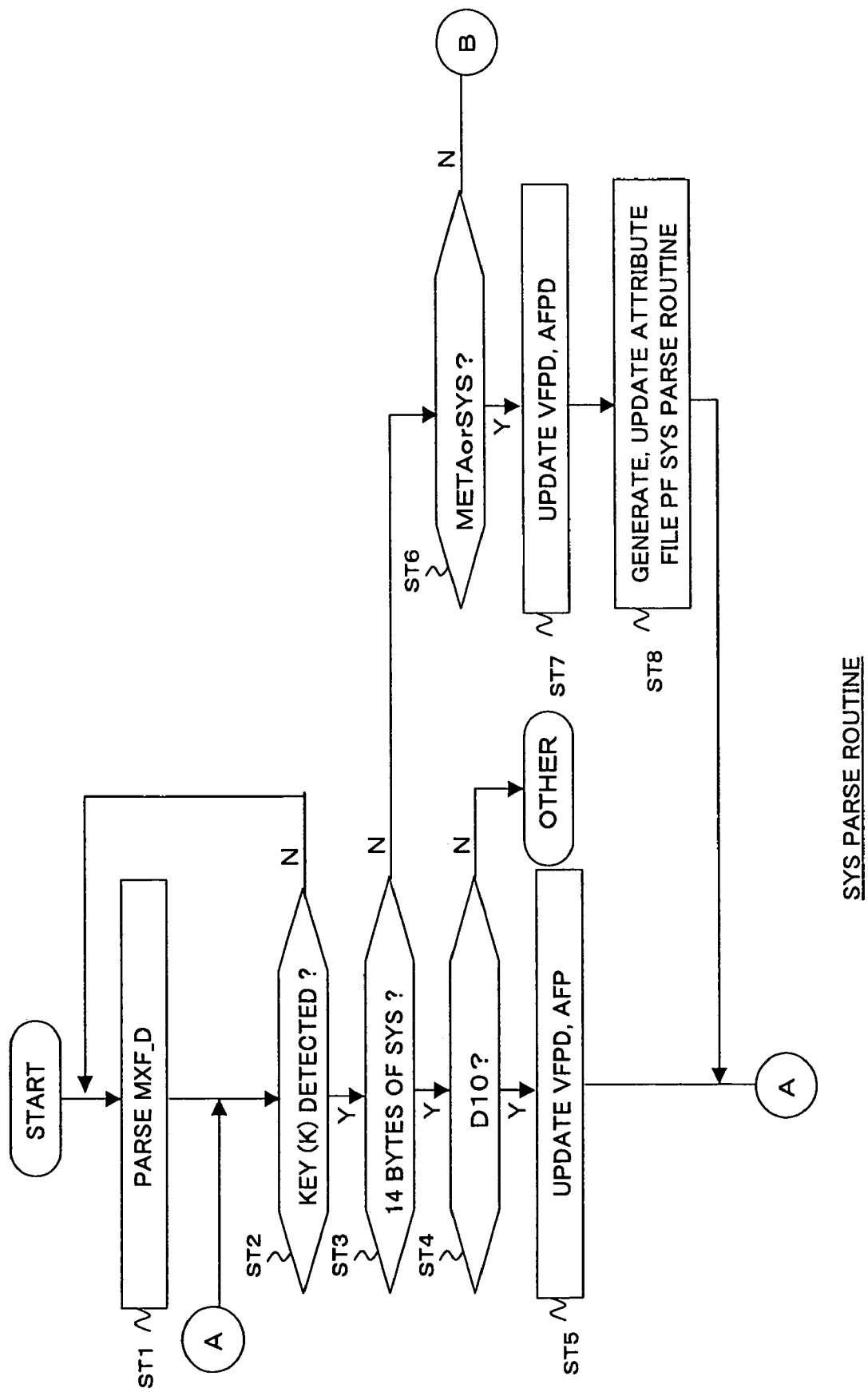
FIG. 13 is a flow chart for explaining processing of an SYS parse routine shown in FIG. 12.
Figure 19:
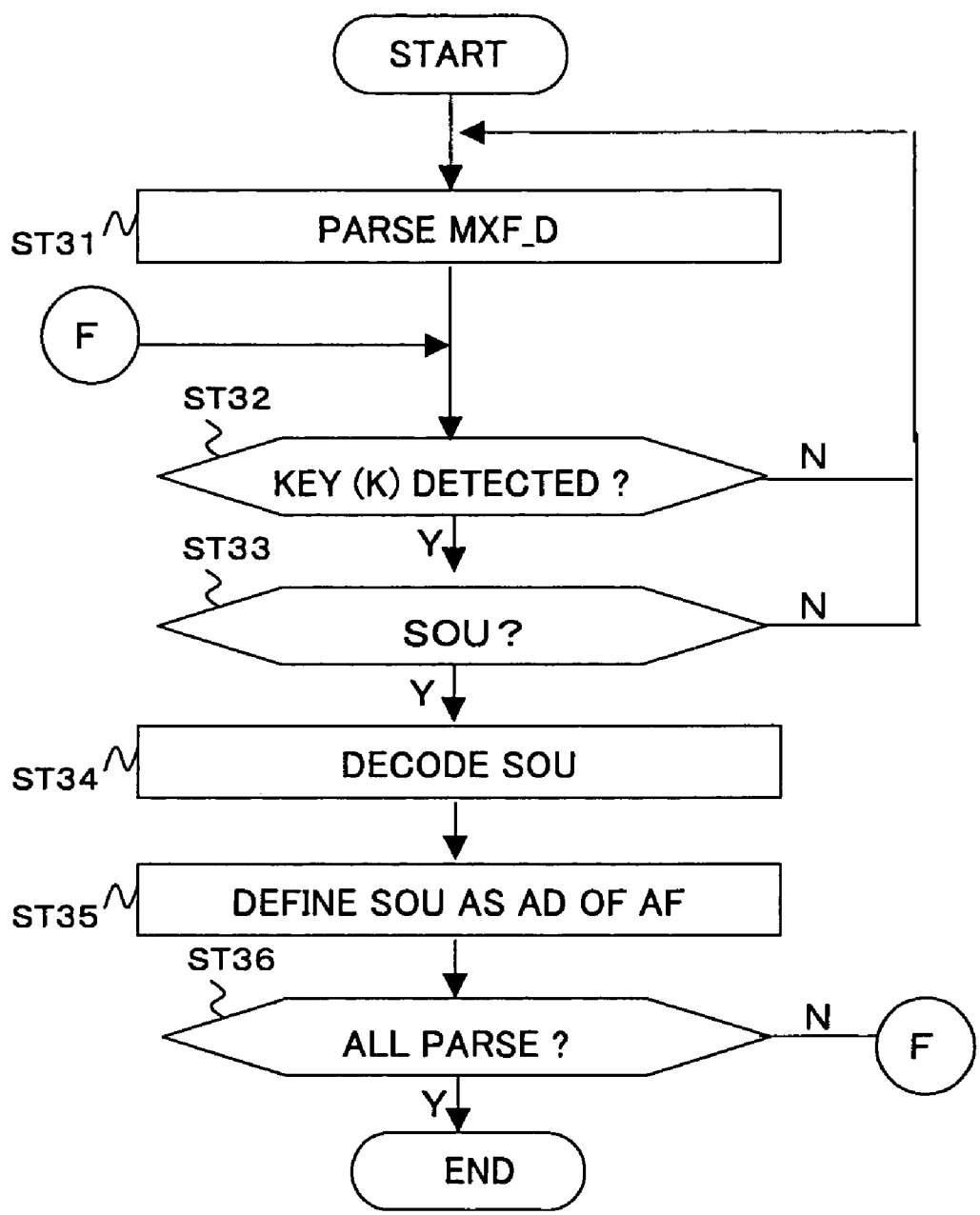
FIG. 19 is a flow chart for explaining the processing of an SOU parse routine shown in FIG. 12.

The third routine of the first aspect of the invention, the third step of the second aspect of the invention, and the third means of the third aspect of the invention are realized by steps ST5, ST7, ST13, and ST14 shown in FIG. 13 and the processing of FIG. 19. The first routine of the fourth aspect of the invention, the first step of the fifth aspect of the invention, and the first means of the sixth aspect of the invention are realized by steps ST41 and ST42 shown in FIG. 20. The second routine of the fourth aspect of the invention, the second step of the fifth aspect of the invention, and the second means of the sixth aspect of the invention are realized by steps ST43 to ST48 shown in FIG. 20.

Correspondence With Seventh to Sixth Aspects of Invention:

The data MXF_D shown in FIG. 5 of the present embodiment corresponds to the first data of the present invention. At least one of the video file data VF shown in FIG. 7 of the present embodiment and the audio file data AF shown in FIG. 9 corresponds to the second data of the present invention, the video file data VF corresponds to the video file data of the present invention, and the audio file data AF corresponds to the audio file data of the present invention. The video data PIC shown in FIG. 6 corresponds to the video data in the first data of the present invention, and the audio data AUDIO corresponds to the audio data in the first data. The system data SYS of the present embodiment corresponds to the first attribute data of the present invention. The video file attribute data VFPD shown in FIG. 7 corresponds to the second attribute data of the present invention. The audio file attribute data AFPD shown in FIG. 9 corresponds to the third attribute data of the present invention. The KLV data shown in FIG. 6 corresponds to the unit data of the present invention, the key (K) corresponds to the identification data of the present invention, the data length (L) corresponds to the data length data of the present invention, and the data (V) corresponds to the data body of the present invention.

The MXF processing program PRG1 of the present embodiment corresponds to the program of the seventh aspect of the invention. The computer 4 corresponds to the data processing system of the present invention. The communication process of the seventh aspect of the invention and the first means of the ninth aspect of the invention correspond to an FTP thread 42 of FIG. 11 etc., and the conversion process of the seventh aspect of the invention and the second means of the ninth aspect of the invention correspond to the MXF parser thread 43 of FIG. 11 etc.

Next, a brief explanation will be given of the editing system 1 shown in FIG. 1 to FIG. 27 according to the first to sixth aspects of the invention. The MXF parser thread 43 shown in FIG. 11 parses the data MXF_D shown in FIG. 5 storing, mixed together, a plurality of video data PIC, a plurality of audio data SOU, and a system data SYS. Then, the MXF parser thread 43 generates the video file attribute data VFPD shown in FIG. 7 concerning the video based on the parsed system data and metadata META and generates the video file data VF including the video file attribute data VFPD and the parsed plurality of video data PIC (VIDEO). The MXF parser thread 43 generates the audio file attribute data AFPD shown in FIG. 9 concerning the audio based on the parsed system data and metadata META and generates the audio file data AF including the audio file attribute data AFPD and the parsed plurality of audio data SOU (AUDIO).

Figure 7:
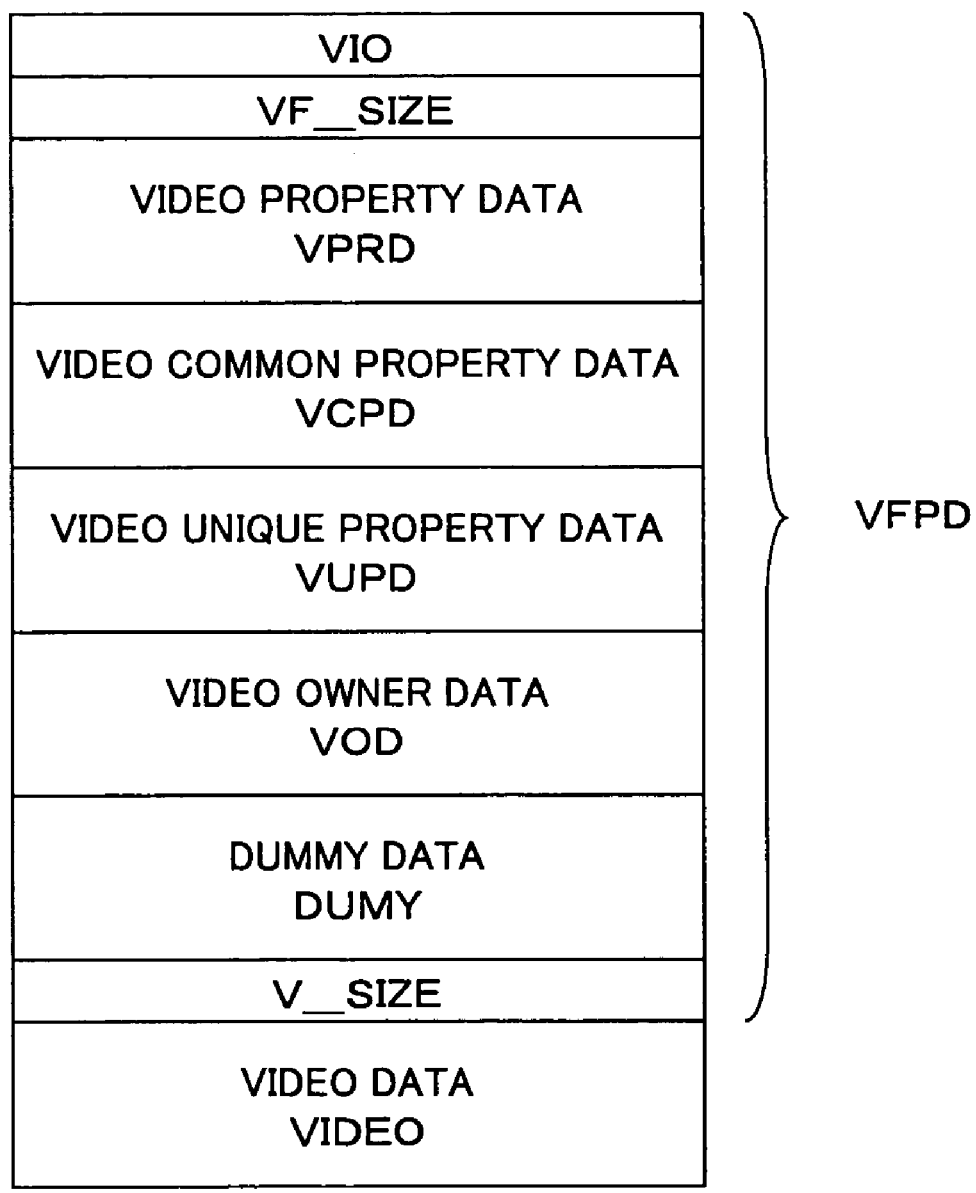
FIG. 7 is a view for explaining video file data VD of an embodiment of the present invention.
Figure 11:
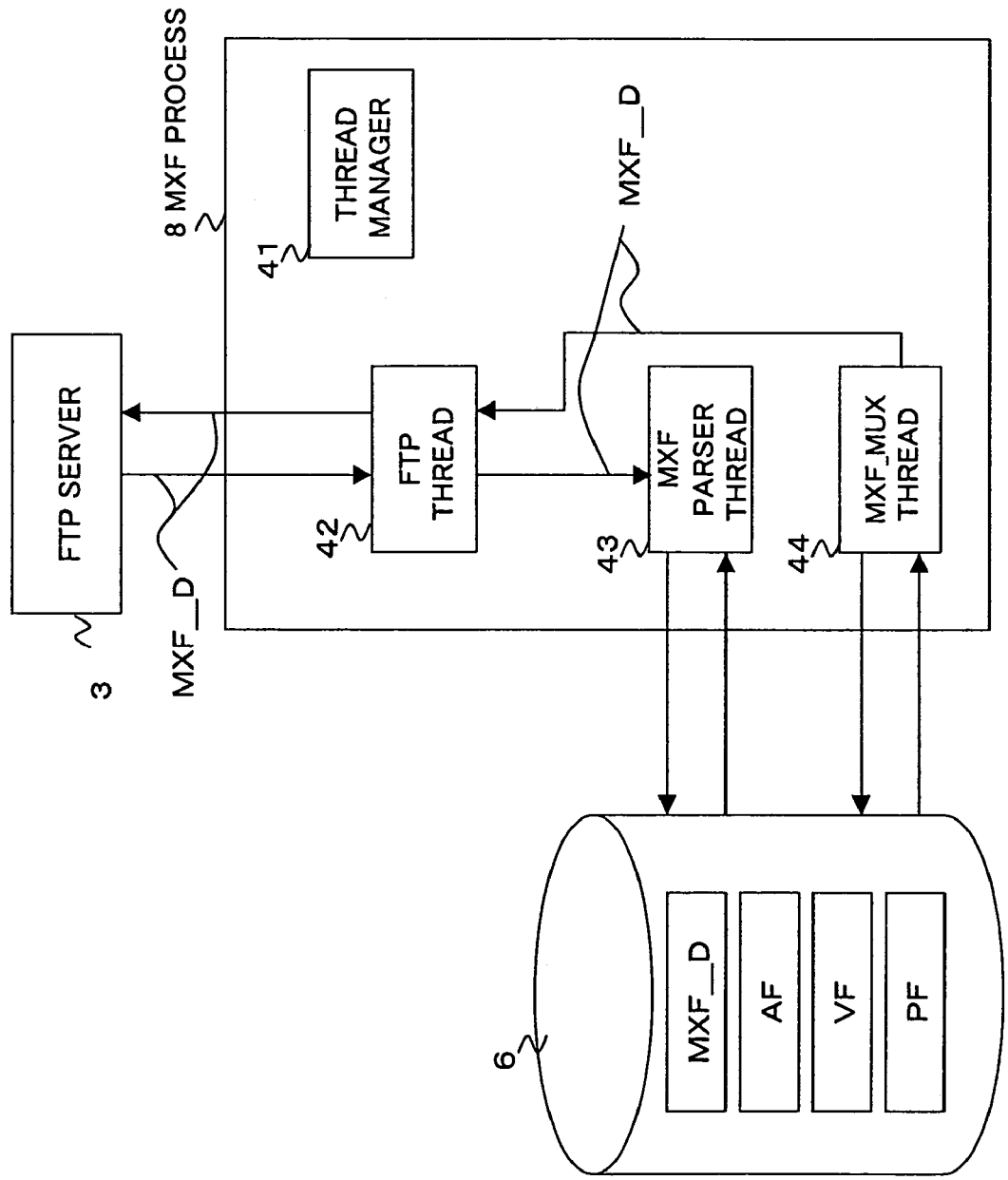
FIG. 11 is a view for explaining an MXF process shown in FIG. 2.

The MXF-MUX thread 44 shown in FIG. 11 specifies a format (D10) based on the video file attribute data VFPD included in the video file data VF shown in FIG. 7. Then, the MXF-MUX thread 44 generates the data MXF_D shown in FIG. 5 defined corresponding to each of the plurality of video data VIDEO included in the video file data VF and composed of a plurality of frame data FLD_1 to FLD_n each including the system data SYS indicating the specified format, a single unit of video data PIC (VIDEO), and a single unit of audio data SOU (AUDIO) corresponding to the video data PIC among a plurality of audio data AUDIO included in the audio file data AF shown in FIG. 9.

Next, a brief explanation will be given of the editing system 1 shown in FIG. 1 to FIG. 27 according to the seventh to ninth aspects of the invention. An MXF process 8 operating on the computer 4 prescribes, as shown in FIG. 11, the FTP thread 42 and the MXF parser thread 43 by the MXF process 8 and performs the processing for reception by the FTP thread 42 and the parse processing by the MXF parser thread 43 in parallel. Due to this, a total time of the FTP reception time and the parse processing can btivates the According to the computer 4, a thread manager 41 activates the MXF parser thread 43 when performing the MXF parse processing, while activates the MXF-MUX thread 44 when performing the MUX processing, so the processing load of a processing unit 15 when not performing the MXF parse processing and MUX processing can be reduced. The MXF parser thread 43 shown in FIG. 11 parses the data MXF_D shown in FIG. 5 storing, mixed together, a plurality of video data PIC, a plurality of audio data SOU, and the system data SYS. Then, the MXF parser thread 43 generates the video file attribute data VFPD shown in FIG. 7 concerning the video based on the parsed system data and metadata META and generates the video file data VF including the video file attribute data VFPD and the parsed plurality of video data PIC (VIDEO). Further, the MXF parser thread 43 generates the audio file attribute data AFPD shown in FIG. 9 concerning the audio based on the parsed system data and metadata META and generates the audio file data AF including the audio file attribute data AFPD and the parsed plurality of audio data SOU (AUDIO).

Figure 1:
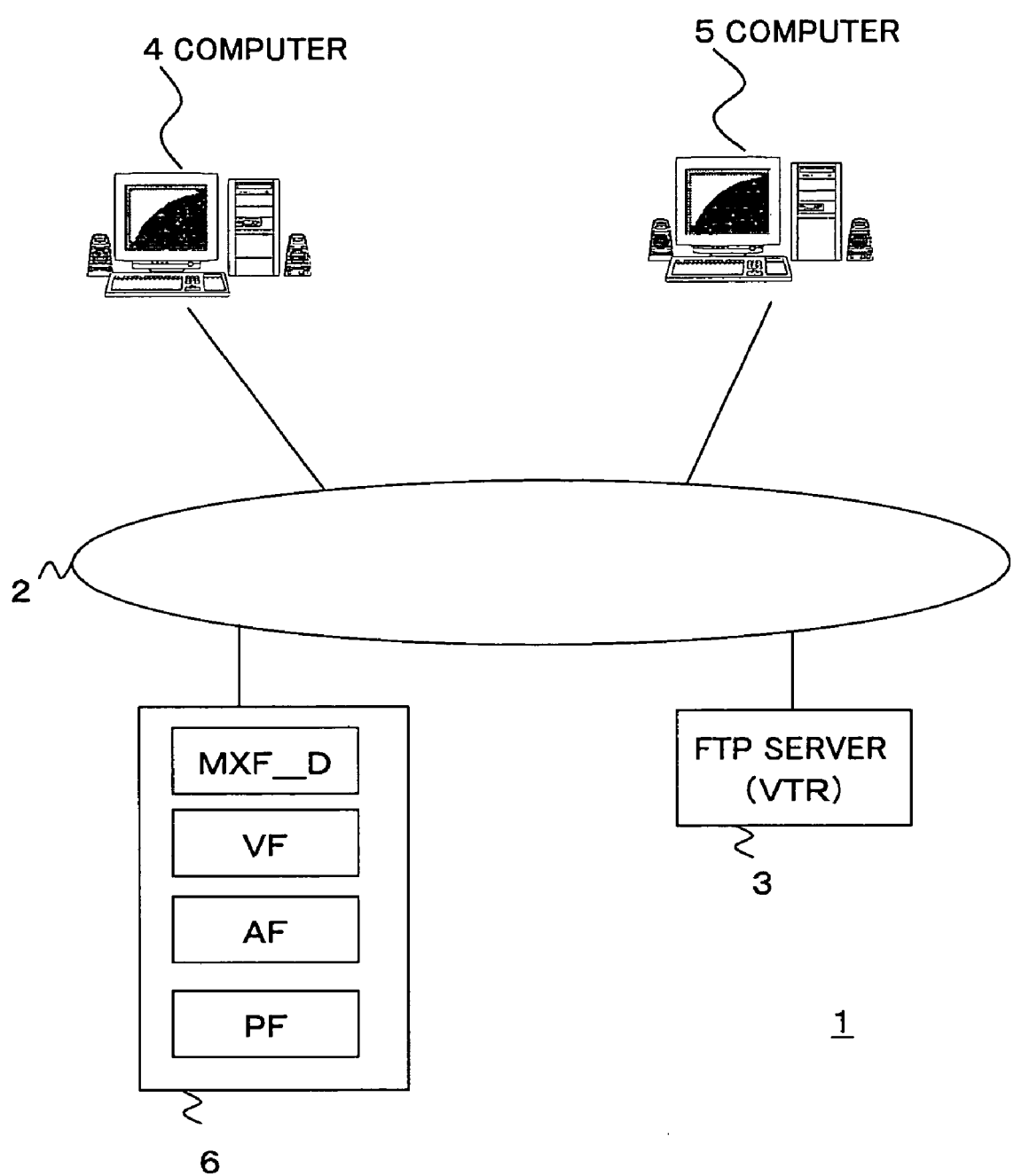
FIG. 1 is a view of the overall configuration of an editing system according to an embodiment of the present invention.

Below, a detailed explanation will be given of the editing system 1 based on the drawings. FIG. 1 is a view of the overall configuration of the editing system 1 according to an embodiment of the present invention. As shown in FIG. 1, the editing system 1 has for example a file transfer protocol (FTP) server 3, a computer 4, a computer 5, and a "redundant array of inexpensive disks" (RAID) 6 which communicate via a network 2. In the present embodiment, for example, the computer 4, the computer 5, and the RAID 6 are connected via a network such as a storage area network (SAN).

[FTP Server 3]

The FTP server 3 transmits the received MXF data to the computer 4 and the computer 5 based on the FTP via the network 2.

[Computer 4]

At the computer 4, for example, as shown in FIG. 2, the MXF process 8 for processing the MXF data and an edit process 9a for performing the edit processing such as a nonlinear edit NLE processing operate. FIG. 3 is a view of the configuration of the computer 4 shown in FIG. 1 and FIG. 2. As shown in FIG. 3, the computer 4 has, for example, a communication unit 11, an operation unit 12, a display unit 13, a memory 14, and a processing unit 15 all connected via a data line 10. The communication unit 11 performs the data transfer with the FTP server 3, the computer 5, and the RAID 6 via the network 2. The operation unit 12 is an operating means such as a keyboard or a mouse and outputs an operation signal in accordance with the operation of the user to the processing unit 15. The display unit 13 displays an image (picture) in accordance with the display signal from the processing unit 15. The memory 14 records the MXF processing program PRG1 describing the processing of the MXF process 8 shown in FIG. 2 and an edit processing program PRG2 describing the processing of the edit process 9a. The processing unit 15 activates the MXF processing 8 based on (by executing) the MXF processing program PRG1 in the memory 14 and activates the edit process 9a based on the edit processing program PRG2. Note that, in the present embodiment, the threads concerning the MXF process 8 are realized by the processing unit 15 executing the MXF processing program PRG1. Further, the threads concerning the edit process 9a are realized by the processing unit 15 executing the edit processing program PRG2.

[Computer 5]

Figure 4:
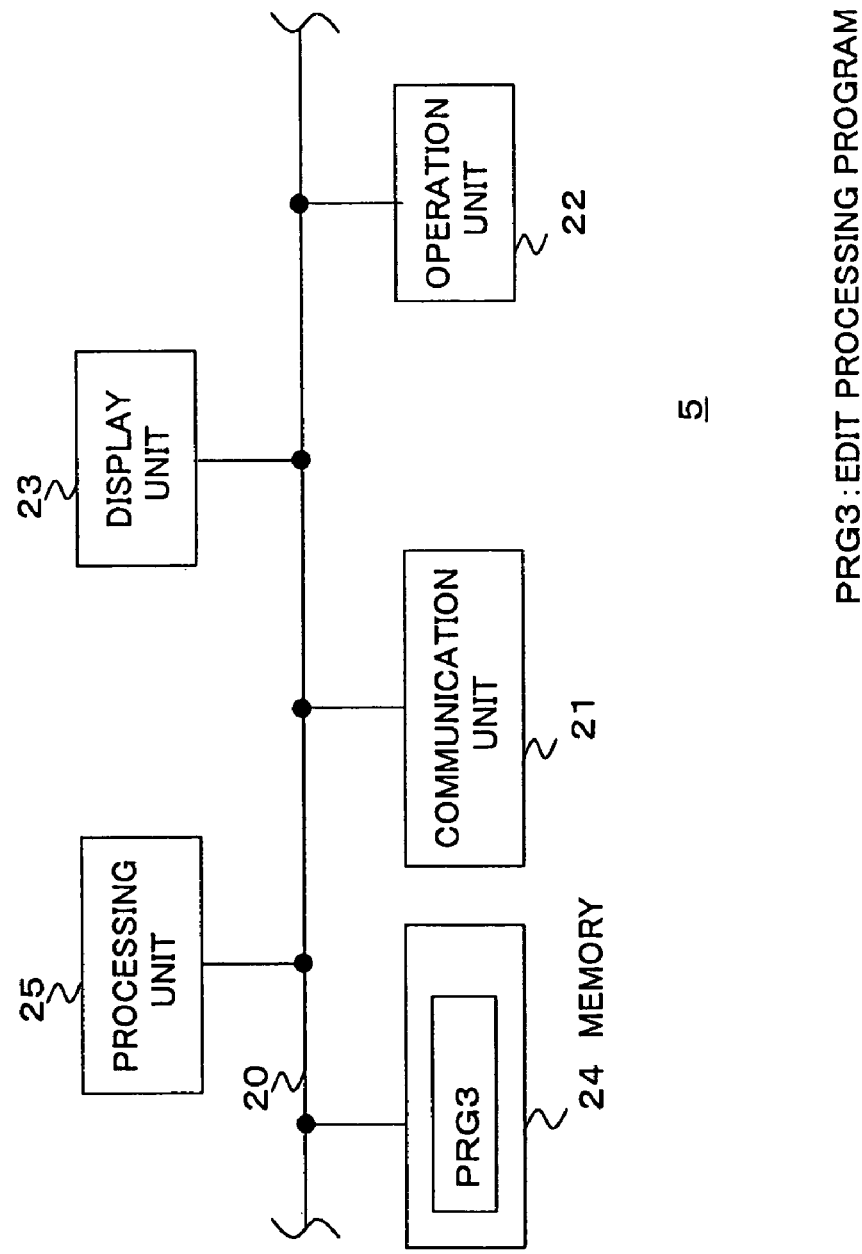
FIG. 4 is a view of the configuration of the computer 5 shown in FIG. 1.

At the computer 5, for example as shown in FIG. 2, an edit process 9b for performing edit processing such as editing operates. FIG. 4 is a view of the configuration of the computer 5 shown in FIG. 1 and FIG. 2. As shown in FIG. 4, the computer 5 has, for example, a communication unit 21, an operation unit 22, a display unit 23, a memory 24, and a processing unit 25 all connected via a data line 20. The communication unit 21 performs the data transfer with the FTP server 3, the computer 4, and the RAID 6 via the network 2. The operation unit 22 is an operating means such as a keyboard and a mouse and outputs an operation signal in accordance with the operation of the user to the processing unit 25. The display unit 23 displays an image (picture) in accordance with the display signal from the processing unit 25. The memory 24 records the edit processing program PRG3 describing the processing of the edit process 9b shown in FIG. 2. The processing unit 25 activates the edit process 9b based on the edit processing program PRG3 recorded in the memory 24. Further, the threads concerning the edit process 9b are realized by the processing unit 25 executing the edit processing program PRG3.

The RAID 6 is for recording the MXF data, video file data VD, audio file data AF, and attribute file data PF. Here, the MXF data is defined by the MXF mentioned later. The video file data VF and the audio file data AF have formats able to be utilized (reproduced) by the edit processes 9a and 9b. The attribute file data PF indicates the attributes of the video file data VF and the audio file data AF.

Below, an explanation will be given of the MXF data, the video file data VF, and the audio file data AF.

[MXF_D]

Below, an explanation will be given of the data MXF_D of the MXF format. FIG. 5 is a view for explaining the format of the data MXF_D. As shown in FIG. 5, the data MXF_D is composed of header data HEADER, body data BODY, and footer data FOOTER. Each of the header data HEADER, the body data BODY, and the footer data FOOTER is composed of a plurality of module data referred to as a pack PACK. The header data HEADER is composed of a header partition pack HPP, metadata META, an index table INDEX, etc. The header partition pack HPP indicates the attribute data with respect to the whole data MXF_D. The header partition pack HPP, when indicating for example "Closed partition", can indicate a frame number which is the number of frame data included in the data MXF_D inside the metadata META.

The metadata META indicates attributes such as a coding method of the frame data (video data and audio data) stored in the body data BODY, a keyword concerning the content of the frame data, a title, identification data, edit data, preparation time data, and edit time data. Further, the metadata META includes, other than the above, for example a time code concerning the frame data, data for specifying dropped frame data, the above frame number (Duration), etc. The index table INDEXT indicates the data used for accessing the frame data in the body data BODY at a high speed when utilizing the data MXF_D.

The body data BODY includes a plurality of frame data FLD_1 to FLD_n. Here, n is any integer of 1 or more.

Each of the frame data FLD_1 to FLD_n, as shown in FIG. 5, includes 1 frame's worth of the video data PIC and audio data SOU, a system data SYS indicating attributes of them, and data AUX.

The system data SYS indicates for example the format and type of the video data PIC and the audio data SOU. The system data SYS indicates for example the format of MXF_D (for example D10 standardized by SMPTE) and type in the format (for example IMX50_625, IMX40_625, IMX30_625, IMX50_525, IMX40_525, and IMX30_525 standardized by SMPTE). The system data SYS indicates, other than the above description, for example a coding system, a time code, identification data of the data MXF_D constituted by a "unique material identifier" (UMID), etc.

The video data PIC is the video data encoded by MPEG (Moving Picture Experts Group) or the like. The audio data SOU is the audio data encoded by AES (Audio Engineering Society) 3 or the like. In this way, the data MXF_D is stored in a state with the video data PIC and the audio data SOU interleaved. The footer data FOOTER includes the identification data indicating the terminal end of the data MXF_D.

Figure 6:
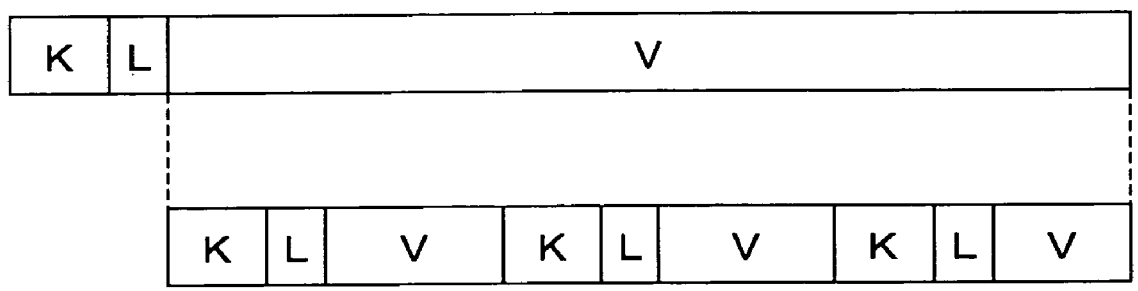
FIG. 6 is a view for explaining a KLV data forming part of the data MXF_D shown in FIG. 4.

Each of the above header partition pack HPP, the metadata META, the index data INDEXT, the frame data FLD_1 to FLD_n, and the footer data FOOTER is composed of one or more pack data PACK. Each pack data is composed of one or more KLV data. FIG. 6 is a view for explaining the KLV data. As shown in FIG. 6, the KLV data is composed of a key (K), a data length (L), and data (V). The key (K) and the data length (L) are data each having a fixed length, the key (K) is identification data of the content of for example the data (V), and the data length (L) indicates the data length of the data (V). Regarding the KLV data, as shown in FIG. 6, use can be made of the KLV data as the data (V).

[VF]

Below, an explanation will be given of the video file data VF of the present embodiment. FIG. 7 is a view for explaining the format of the video file data VF of the present embodiment. As shown in FIG. 7, the video file data VF includes for example identification data VIO, data VF_SIZE, video property data VPRD, video common property data VCPD, video unique property data VTPD, video owner data VOD, dummy data DUMY, data V_SIZE, and video data VIDEO. In the present embodiment, the video file attribute data VFPD is comprised of the identification data VIO, the data VF_SIZE, the video property data VPRD, the video common property data VCPD, the video unique property data VUPD, the video owner data VOD, the dummy data DUMY, and the data V_SIZE. The identification data VIO indicates the head of the video file data VF. The data VF_SIZE indicates the data length of the video file data VF. The video property data VPRD indicates the identification data of the video file data VF, the version information, etc.

The video common property data VCPD indicates the specific information common to all video formats. The video common property data VCPD indicates, for example, as shown in FIG. 8, a data VideoFormat, Width, Height, Framesize, Scale, Rate, Scanlineinfo, etc. The data VideoFormat indicates the type of the video data VIDEO, for example existence of compression, whether or not it is DV (Digital Video), whether or not it is MPEG (coding method), and whether or not it is HDCAM (Handycam). The data Width indicates a number of pixels in a lateral direction of the image (lateral width) of the video data VIDEO. The data Height indicates the number of lines in a vertical direction of the image (vertical width) of the video data VIDEO. The data Framesize indicates the size (data length) of one frame by the number of bytes. In the present embodiment, the size is a multiple of 4096 bytes. The data Scale and Rate are used for obtaining data indicating the reproduction rate by the number of frames per second by dividing the unit of time Rate by Scale. The data Scanlineinfo indicates the scan line information.

The video unique property data VUPD indicates the property information unique to the format designated by the data Videoformat. The video unique property data VUPD indicates for example the type of the noncompression data, the type of the DV format, the type of the MPEG format, and the data type of MPEG. The video owner data VOD indicates the information concerning the application which owns the video file data VF at present. The dummy data DUMY is the data prescribed so that the size of the video file attribute data VFPD becomes 4096 bytes. The data V_SIZE indicates the data size of the video file data VIDEO. The video data VIDEO is the video data of a plurality of frames prescribed so that one frame becomes a whole multiple of 4096 bytes. By this, it becomes possible to access the video data VIDEO using 4096 bytes as the minimum unit. In the data MXF_D, the coding method of the video data VIDEO, the format of the compression method, etc. may be any method, format, etc.

[AF]

Figure 9:
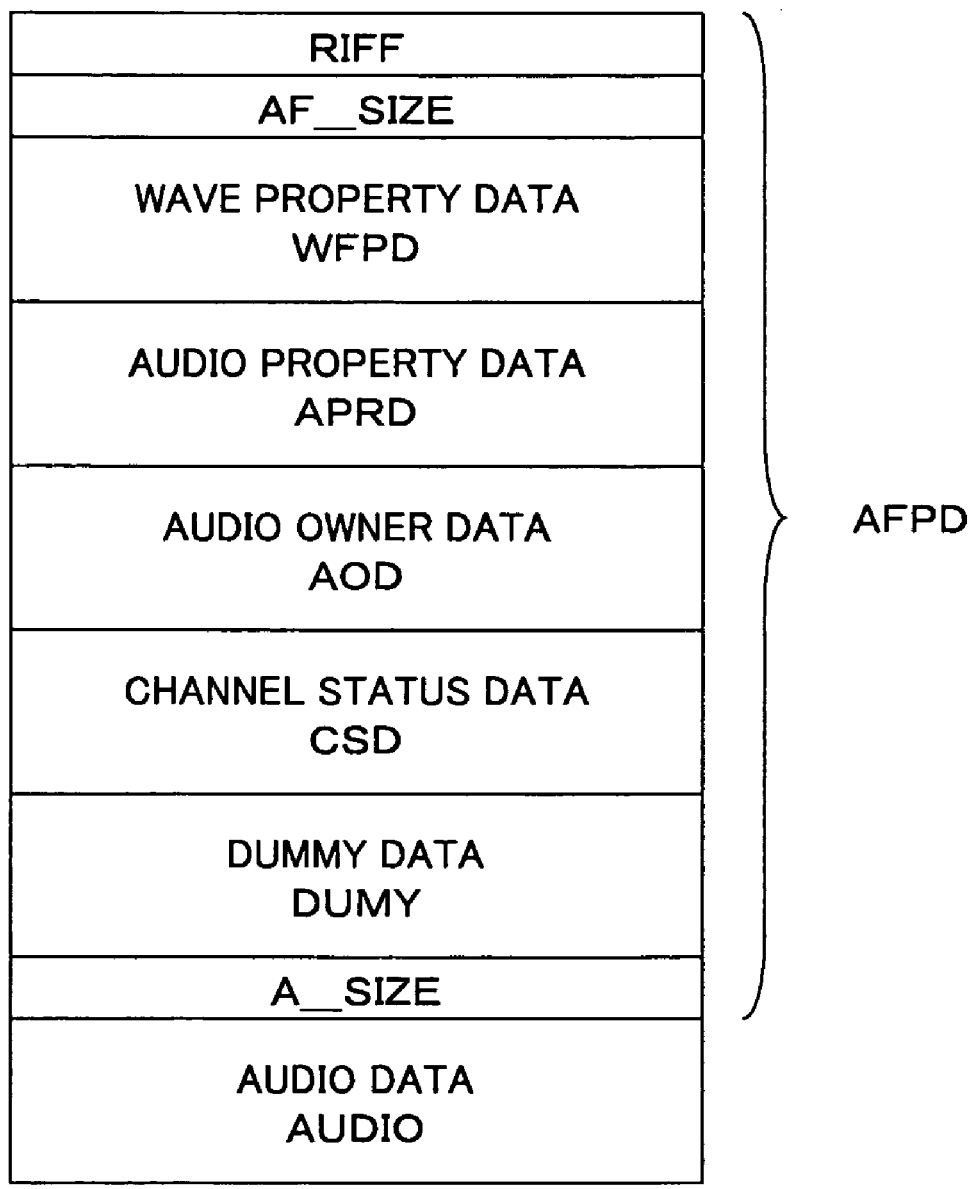
FIG. 9 is a view for explaining audio file data AF of the embodiment of the present invention.

Below, an explanation will be given of the audio file data AF of the present embodiment. FIG. 9 is a view for explaining the format of the audio file data AF of the present embodiment. As shown in FIG. 9, the application program AP includes identification data RIFF, data AF_SIZE, WAVE property data WFPD, audio property data APRD, audio owner data AOD, channel status data CSD, dummy data DUMY, data A_SIZE, and audio data AUDIO. In the present embodiment, the audio file attribute data AFPD is composed of the identification data RIFF, the data AF_SIZE, the WAVE property data WFPD, the audio property data APRD, the audio owner data AOD, the channel status data CSD, the dummy data DUMY, and the data A_SIZE. The identification data RIFF indicates the head of the audio file data AF. The data AF_SIZE indicates the data length of the audio file data AF. The WAVE property data WFPD indicates, for example, as shown in FIG. 10, data wFormatTag, nChannels, nSamplesPerSec, nAvgBytesPerSec, nBlockAlign, wBitsPerSample, and cbSise. The data wFormatTag indicates the format of the audio file data AF. The data nChannels indicates the number of channels. The data nSamplesPerSec indicates the sample rate. The data nAvgBytesPerSec indicates a buffer estimation. The data nBlockAlign indicates the block size of the data. The data wBitsPerSample indicates the number of sample bits of the unit of mono data. The data cbSise indicates the number of bytes of the size of the expansion information.

The audio property data APRD indicates the data length of the audio data AUDIO, the version of the audio file data AF, etc. The audio owner data AOD indicates the information concerning the application which has the audio file data AF at present. The channel status data CSD indicates the information concerning the channel of the audio data AUDIO. The dummy data DUMY is the data prescribed so that the size of the audio file attribute data AFPD becomes 4096 bytes. The data A_SIZE indicates the data length of the audio data AUDIO. The audio data AUDIO is audio data of a format such as for example the AES (Audio Engineering Society) 3.

[MXF Process 8]

FIG. 11 is a view for explaining the MXF process 8 shown in FIG. 2. The MXF process 8 for example generates the video file data VF and the audio file data AF from the data MXF_D and generates the data MXF_D from the video file data VF and the audio file data AF. In this case, the MXF process 8 has, as shown in FIG. 11, for example a thread manager 41, an FTP thread 42, an MXF parser thread 43, and an MXF_MUX thread 44.

[Thread Manager 41]

The thread manager 41 activates the MXF parser thread 43 and the MXF_MUX thread 44 in response to commands from for example the edit processes 9a and 9b or a request such as the operation signal from the operation unit 12 shown in FIG. 3.

[FTP Thread 42]

The FTP thread 42 transfers data MXF_D by FTP with the FTP server 3. The FTP thread 42 outputs the data MXF_D received from the FTP server 3 to the MXF parser thread 43 by FTP. The FTP thread 42 transmits the data MXF_D input from the MXF_MUX thread 44 to the FTP server 3 by FTP.

[MXF Parser Thread 43]

The MXF parser thread 43 converts the data MXF_D received via the FTP thread 42 or the data MXF_D read out from the RAID 6 to the video file data VF and the audio file data AF and writes the same to the RAID 6. Further, the MXF parser thread 43 outputs the video data VIDEO and the audio data AUDIO extracted by parsing the data MXF_D input from the FTP thread 42 to the edit processes 9a and 9b in a format that the edit processes 9a and 9b can reproduce. In the present embodiment, the MXF parser thread 43 is not activated in a state where the MXF parse processing is not carried out. When the MXF parse processing is carried out, the thread manager 41 activates the MXF parser thread 43 in response to the commands from the edit processes 9a and 9b or a request such as the operation signal from the operation unit 12 shown in FIG. 3. Due to this, the processing load of the computer 4 (processing unit 15) can be reduced in a state where the MXF parse processing is not carried out.

Further, in the present embodiment, the FTP thread 42 and the MXF parser thread 43 are realized not by different programs, but by the same MXF process 8. Therefore, when the data MXF_D received by the MXF parser thread 43 via the FTP thread 42 is subjected to conversion processing, the MXF parse processing of the already received data MXF_D can be carried out in parallel with the reception processing of the data MXF_D by the FTP thread 42. Due to this, the processing time can be shortened compared with a case where the program for performing the FTP and the program for performing the MXF parse processing are separately prescribed and the MXF parse processing is carried out after the FTP processing with respect to the whole data MXF_D is ended.

Figure 12:
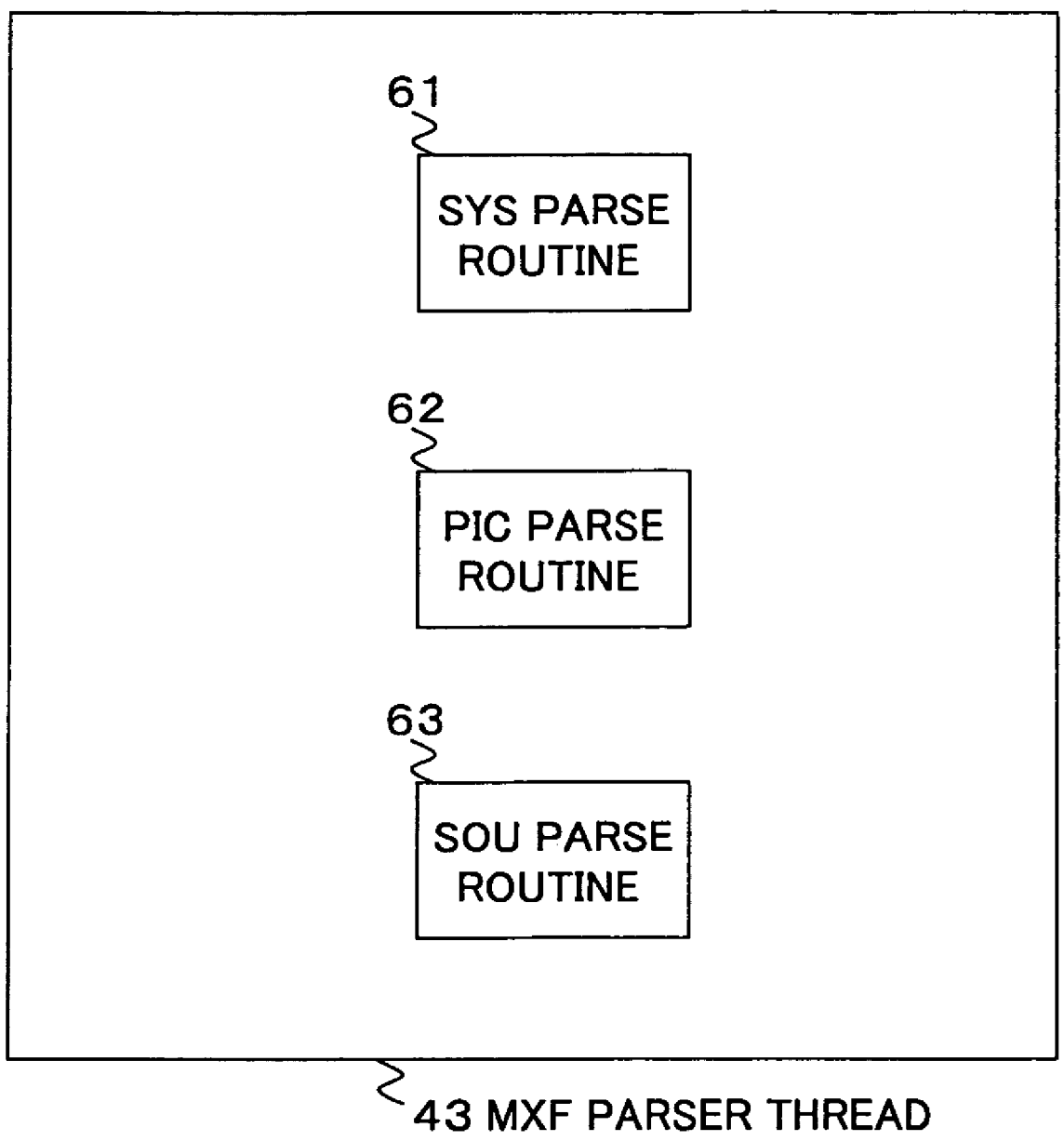
FIG. 12 is a view for explaining an MXF parser thread shown in FIG. 11.

FIG. 12 is a function block diagram of the MXF parser thread 43 shown in FIG. 11. As shown in FIG. 12, the MXF parser thread 43 has for example an SYS parse routine 61, a PIC parse routine 62, and an SOU parse routine 63. The MXF parser thread 43 generates video file data VF comprised of video attribute file data VFPD generated by the SYS parse routine 61 and video data VIDEO generated by the PIC parse routine 62 as shown below. The MXF parser thread 43 generates the audio file data AF comprised of the audio attribute file data AFPD generated by the SYS parse routine 61 and the audio data AUDIO generated by the SOU parse routine 63. Further, the MXF parser thread 43 generates the attribute file data PF indicating the attributes concerning for example the video file data VF and the audio file data AF by the SYS parse routine 61 as will be shown below. In this case, the sequence of execution of the SYS parse routine 61, the PIC-parse routine 62, and the SOU parse routine 63 is not particularly limited.

The SYS parse routine 61, the PIC parse routine 62, and the SOU parse routine 63 parse the data MXF_D shown in FIG. 5 to detect the key (K) of the KLV data shown in FIG. 6 and generate the data shown below based on the detected key (K) by using data determined in advance.

The SYS parse routine 61 parses the data MXF_D shown in FIG. 5 and generates the video file attribute data VFPD of the video file data VF shown in FIG. 7 and the audio file attribute data AFPD of the audio file data AF shown in FIG. 9 based on the header data HEADER in the data MXF_D, the system data SYS in the frame data FLD_1 to FLD_n, and the footer data FOOTER.

Figure 14:
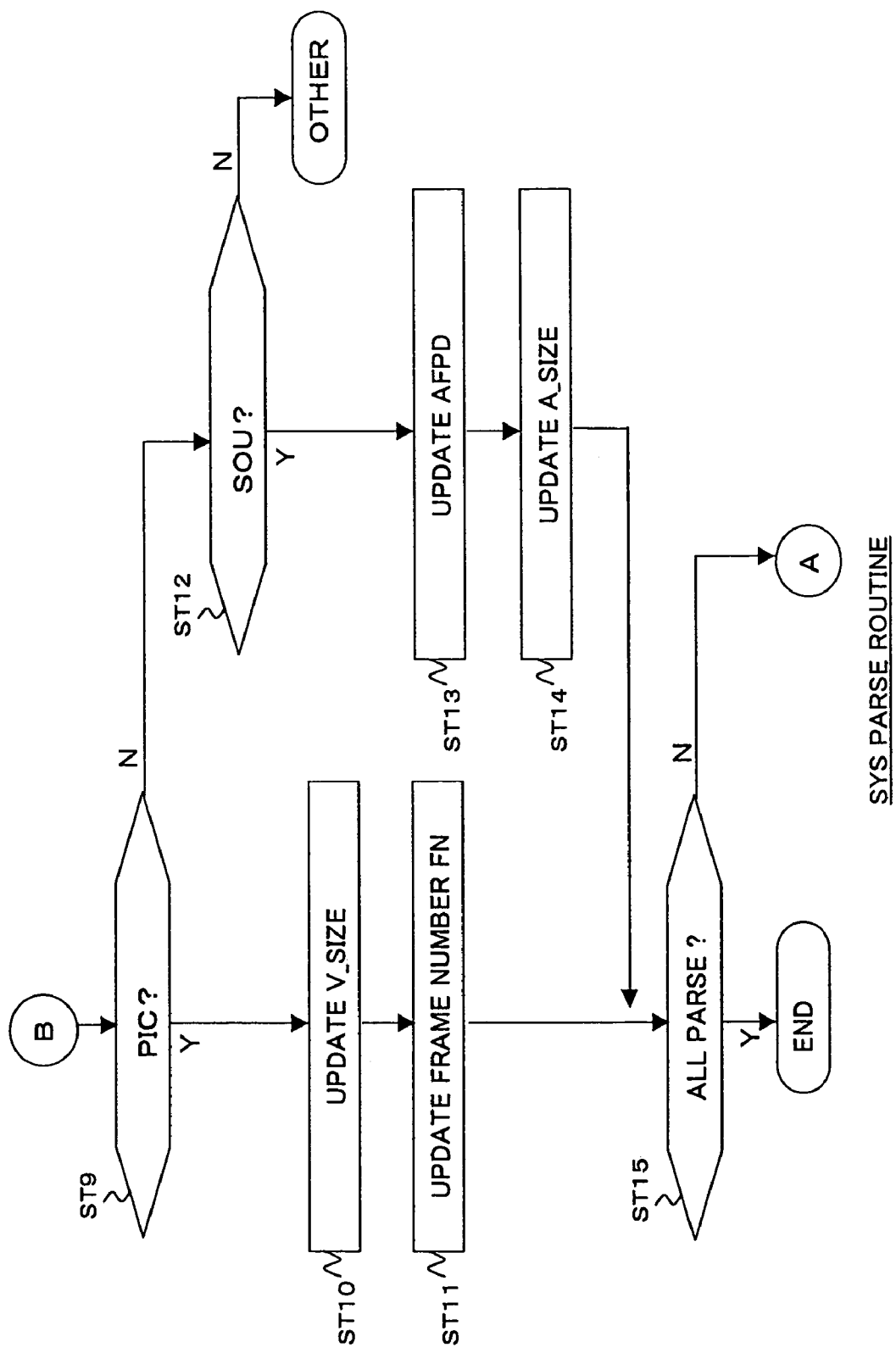
FIG. 14 is a flow chart continued from FIG. 13 for explaining the processing of the SYS parse routine shown in FIG. 12.

FIG. 13 and FIG. 14 are flow charts for explaining the processing of the SYS parse routine 61 shown in FIG. 12. Note that, in FIG. 13, it is also possible to perform the decision of step ST6 preceding the decision of step ST3.

Step ST1:

The SYS parse routine 61 parses the data MXF_D read out from the data MXF_D or the RAID 6 input from the FTP thread 42.

Step ST2:

The SYS parse routine 61 decides whether or not the key (K) of the KLV data forming part of the data MXF_D was detected by the parse of step ST1. Where it was detected, the processing routine proceeds to step ST4, while where it was not detected, the processing routine returns to step ST6.

Step ST3:

The SYS parse routine 61 decides whether or not the key (K) detected at step ST1 concerns the 14-th byte (at the predetermined position) of the system data SYS. When deciding that it concerns the 14-th type, the processing routine proceeds to step ST4, while when it does not, the processing routine proceeds to step ST6.

Step ST4:

The SYS parse routine 61 decides whether or not the data MXF_D has a "D10" format (predetermined format) based on the 14-th byte. Where it is the "D10" format, the processing routine proceeds to step ST5, while where it is not, the processing is terminated or the processing concerning another format is carried out.

Step ST5:

When the type of the data MXF_D is IMX50_625, IMX40_625, and IMX30_625, the SYS parse routine 61, based on the 15-th byte of the system data SYS, sets for example the values shown in FIG. 15(A) prescribed in advance as the VideoFormat, Width, Height, Framesize, Scale, Rate, and Scanlineinfo shown in FIG. 8 of the video common property data VCPD shown in FIG. 7 to update the video file attribute data VFPD. Here, the data Framesize is prescribed for example as shown in FIG. 16 in accordance with the type of the format. Further, the SYS parse routine 61 sets for example the values shown in FIG. 17 prescribed in advance as the data wFoprmatTag, cChannels, nSamplesPerSec, nAvgBytesPerSec, nBlockAlign, wBitsPerSample, and cbSise shown in FIG. 10 of the WAVE property data WFPD shown in FIG. 9 to update the audio file attribute data AFPD. On the other hand, when the data MXF_D is IMX50_525, IMX40_525, and IMX30_525, the SYS parse routine 61, based on the 15-th byte of the system data SYS, sets for example the values shown in FIG. 15(B) prescribed in advance as the data VideoFormat, Width, Height, FramAsize, Scale, Rate, and Scanlineinfo shown in FIG. 8 of the video common property data VCPD shown in FIG. 7 to update the video file attribute data VFPD.

Step ST6:

The SYS parse routine 61 decides whether or not the key (K) detected at step ST1 concerns the metadata META or the system data SYS. Where it does, the processing routine proceeds to step ST7, while where it does not, Step ST7:

The SYS parse routine 61 generates or updates the video file attribute data VFPD shown in FIG. 7 and the audio file attribute data AFPD shown in FIG. 9 based on the data (V) corresponding to the key (K) detected at step ST1.

Step ST8:

The SYS parse routine 61 generates or updates the audio file data PF by using XML etc. based on the data (V) corresponding to the key (K) detected at step ST1. Namely, the SYS parse routine 61 generates the attribute file data PF indicating the attributes of the video file data VF and the audio file data AF based on the metadata META in the data MXF_D or the attribute data described in the system data SYS.

Step ST9:

The SYS parse routine 61 decides whether or not the key (K) detected at step ST1 concerns the video data PIC. Where it does, the processing routine proceeds to step ST10, while where it does not, the processing routine proceeds to step ST12.

Step ST10:

The SYS parse routine 61 adds the data length (L) corresponding to the key (K) detected at step ST1 to the data V_SIZE to update the data V_SIZE.

Step ST11:

The SYS parse routine 61 updates (increments) the frame number data FN.

Step ST12:

The SYS parse routine 61 decides whether or not the key (K) detected at step ST1 concerns the audio data SOU. Where it does, the processing routine proceeds to step ST13, while where it does not, the processing is terminated or other processing is carried out.

Step ST13:

The SYS parse routine 61 sets for example the values shown in FIG. 17 determined in advance as the WAVE property data WFPD shown in FIG. 10 of the audio file attribute data AFPD shown in FIG. 9. The set-up may be carried out only when executing step ST13 first. The SYS parse routine 61 sets the channel status data CSD of the audio file attribute data AFPD shown in FIG. 9 based on the data (V) corresponding to the key (K) detected at step ST1, that is, the data channel status of the audio data SOU of AES3. In the data Channel_Status, the information etc. for designating for example a valid channel is shown. Further, the SYS parse routine 61 changes the data nSamplesPerSec, nAvgBytesPerSec, nBlockAlign, and wBitsPerSample shown in FIG. 10 of the WAVE property data WFPD shown in FIG. 9 based on the data SamplingRate, AuxSampleBits, and WordLength prescribed by AES3 of the audio data SOU.

Step ST14:

The SYS parse routine 61 adds the data length (L) corresponding to the key (K) detected at step ST1 to the data A_SIZE to update the A_SIZE.

Step ST15:

The SYS parse routine 61 decides whether or not the whole data MXF_D was parsed. When deciding that it was parsed, the processing routine is terminated, while where deciding it was not, the processing routine returns to step ST1.

By the processings of FIG. 13 and FIG. 14, the header data HEADER and the system data SYS shown in FIG. 5 are generated.

The PIC parse routine 62 parses the data MXF_D shown in FIG. 5 and generates the video data VIDEO of the video file data VF shown in FIG. 7 based on the video data PIC in the frame data FLD_1 to FLD_n of the data MXF_D. The PIC parse routine 62 decodes for example the video data PIC by MPEG to generate the video data VIDEO where the video data PIC is encoded by MPEG.

Figure 18:
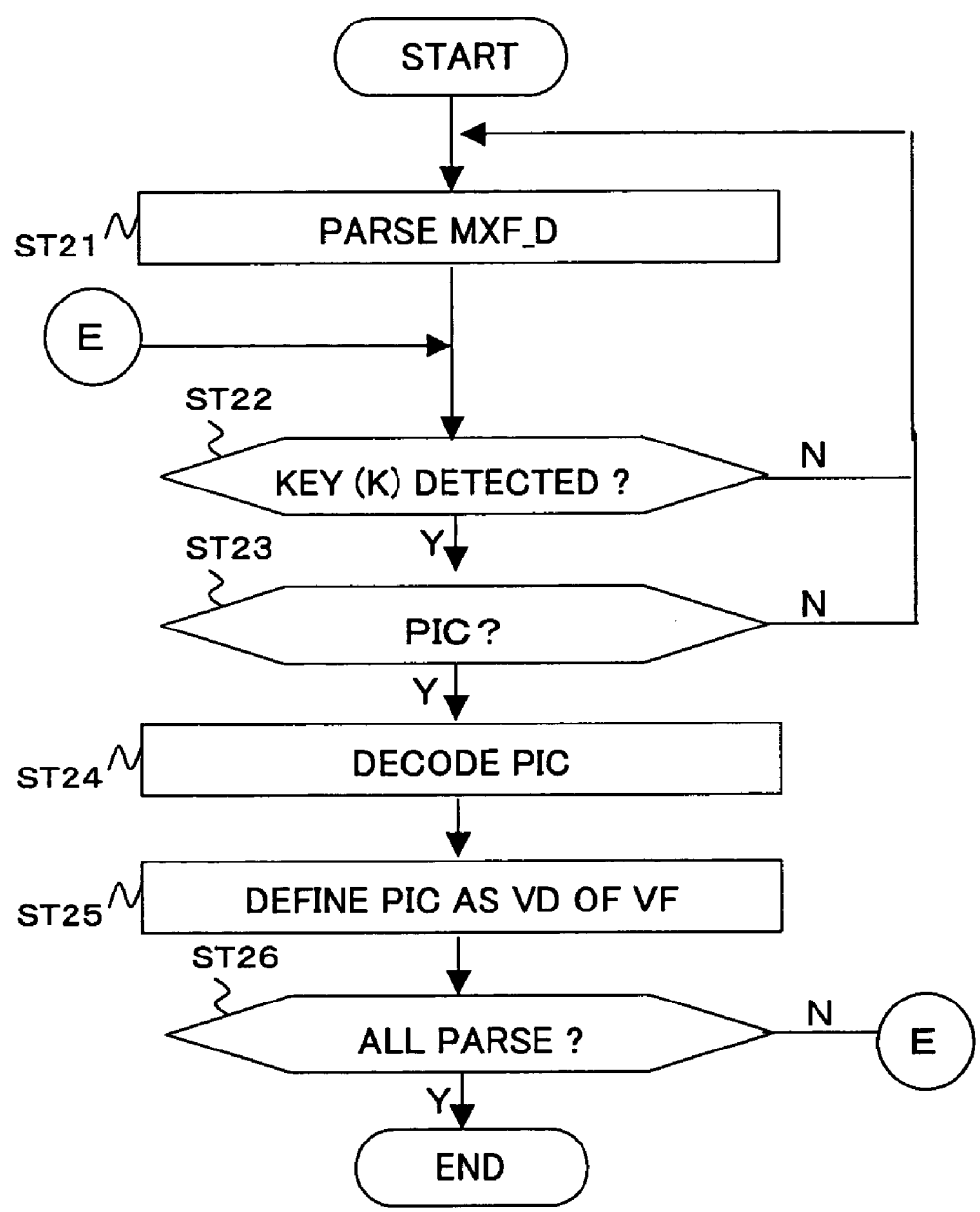
FIG. 18 is a flow chart for explaining the processing of a PIC parse routine shown in FIG. 12.

FIG. 18 is a flow chart for explaining the processing of the PIC parse routine 62 shown in FIG. 12.

Step ST21:

The PIC parse routine 62 parses the data MXF_D.

Step ST22:

The PIC parse routine 62 decides whether or not the key (K) of the KLV data composing the data MXF_D was detected by the parse of step ST21. Where it was detected, the processing routine proceeds to step ST22, while where it was not, the processing routine returns to step ST21.

Step ST23:

The PIC parse routine 62 decides whether or not the key (K) detected at step ST21 concerns the video data PIC. When deciding so, the processing routine proceeds to step ST24, while where not, the processing routine returns to step ST21.

Step ST24:

The PIC parse routine 62 decodes the video data PIC by the key (K) detected at step ST21 by the decoding method corresponding to the coding method described in for example the system data SYS or metadata META corresponding to that.

Step ST25:

The PIC parse routine 62 uses the video data PIC obtained by the decoding of step ST24 as the video data VIDEO of the video file data VF shown in FIG. 7.

Step ST26:

The PIC parse routine 62 decides whether or not all of the data MXF_D was parsed. When deciding all data MXF_D was parsed, the processing routine is terminated, while where not, the processing routine returns to step ST21.

The SOU parse routine 63 parses the data MXF_D shown in FIG. 5 to generate the audio data AUDIO of the audio file data AF shown in FIG. 9 based on the audio data SOU in the frame data FLD_1 to FLD_n of the data MXF_D. In this case, the SOU parse routine 63 separates a plurality of channel data to generate the audio data AUDIO where the audio data SOU is the AES3 standard.

FIG. 19 is a flow chart for explaining the processing of the SOU parse routine 63 shown in FIG. 12.

Step ST31:

The SOU parse routine 63 parses the data MXF_D.

Step ST32:

The SOU parse routine 63 decides whether or not the key (K) of the KLV data composing the data MXF_D was detected by the parse of step ST31. Where it was detected, the processing routine proceeds to step ST 32, while where it was not detected, the processing routine returns to step ST31.

Step ST33:

The SOU parse routine 63 decides whether or not the key (K) detected at step ST32 concerns the audio data SOU. When deciding it does, the processing routine proceeds to step ST34, while where deciding it does not, the processing routine returns to step ST31.

Step ST34:

The SOU parse routine 63 decodes the audio data SOU by the key (K) detected at step ST31 by the decoding method corresponding to the coding method described in for example the system data SYS corresponding to that.

Step ST35:

The SOU parse routine 63 uses thdio data AUD SOU obtained by the decoding of step ST34 as the audio data AUDIO of the audio file data AF shown in FIG. 9.

Step ST36:

The SOU parse routine 63 decides whether or not the data MXF_D was all parsed. When deciding that the data MXF_D was all parsed, the processing routine is terminated, while when not, the processing routine returns to step ST31.

[MXF_MUX Thread 44]

The MXF_MUX thread 44 generates the data MXF_D based on the attribute file data PF, the video file data VF, and the audio file data AF. In the present embodiment, the MXF_MUX thread 44 is not activated in the state where the MXF_MUX processing is not carried out. Where the MXF_MUX processing is carried out, the thread manager 41 activates the MXF_MUX thread 44 in response to commands from the edit processes 9a and 9b or the request of the operation signal etc. from the operation unit 12 shown in FIG. 3. Due to this, the processing load of the computer 4 (processing unit 15) can be reduced in the state where the MXF_MUX processing is not carried out.

Figure 20:
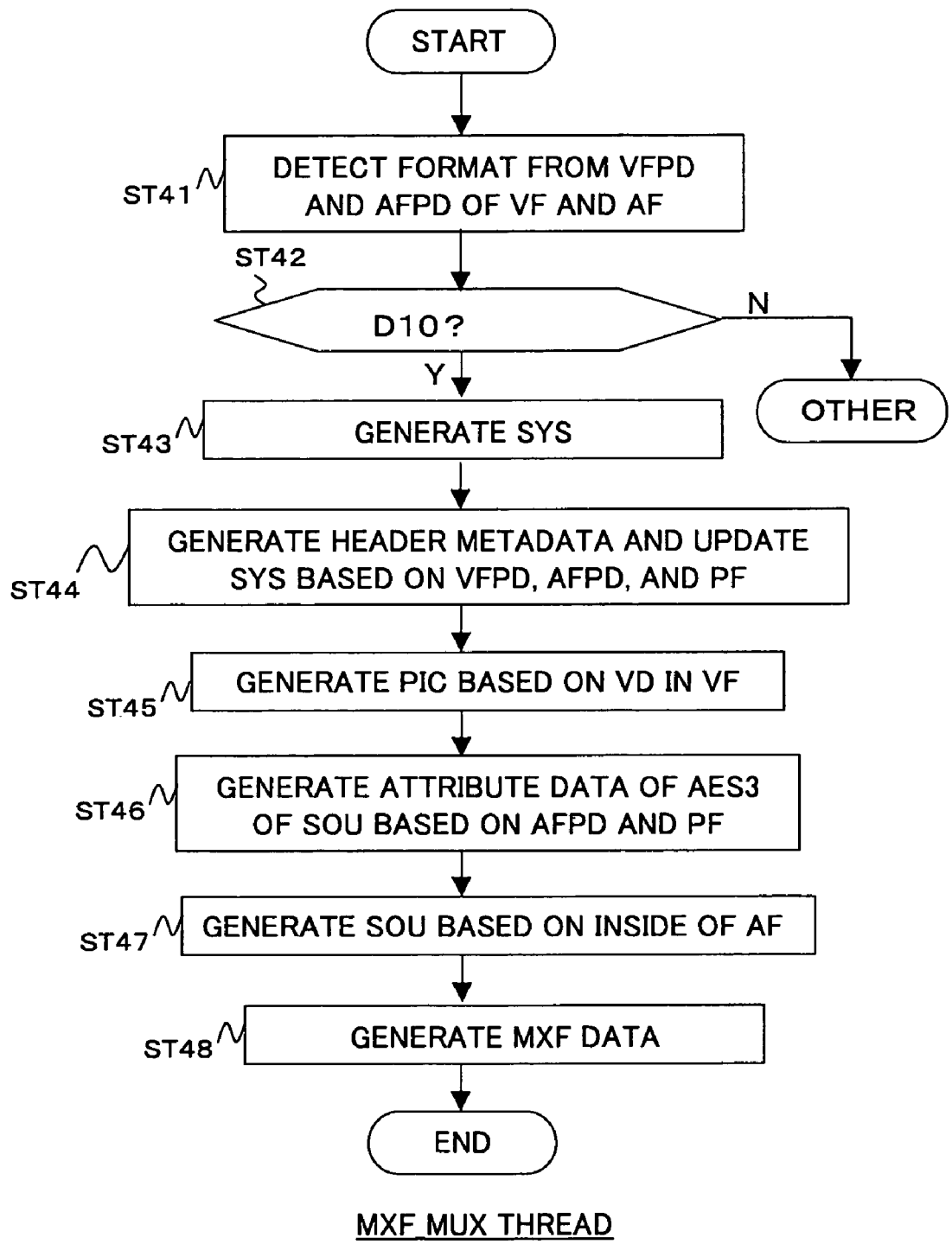
FIG. 20 is a flow chart for explaining the processing of an MXF-MUX thread shown in FIG. 11.

FIG. 20 is a flow chart for explaining the processing for generation of the data MXF_D by the MXF_MUX thread 44.

Step ST41:

The MXF_MUX thread 44 reads out the video file data VF shown in FIG. 7 designated as the conversion object from the RAID 6 upon request and detects the format used as the data MXF_D based on the data shown in FIG. 8 in the video common property data VCPD in the video file data VF.

Step ST42:

The MXF_MUX thread 44 decides whether or not the format detected at step ST41 is "D10" (predetermined format). When deciding that the format is "D10", the processing routine proceeds to step ST43, while when not, it performs the processing corresponding to a format other than "D10".

Step ST43:

The MXF_MUX thread 44 sets the data indicating "D10" as the 14-th byte (data of the predetermined position) of the system data SYS of the frame data FLD_1 to FLD_n of the data MXF_D shown in FIG. 5. Further, the MXF_MUX thread 44 specifies the type of the format based on the data shown in FIGS. 15(A) and 15(B) in the video file data VF and the frameSise etc. shown in FIG. 15 and sets the specified type as the 15-th byte of the system data SYS.

Step ST44:

The MXF_MUX thread 44 generates the header data HEADER shown in FIG. 5 and, and, at the same time, updates the system data SYS based on the video file attribute data VFPD of the video file data VF, the audio file attribute data AFPD of the audio file data AF, and the attribute file data PF.

Step ST45:

The MXF_MUX thread 44 encodes the video data VIDEO in the video file data VF by for example the coding method indicated by the video file attribute data VFPD (for example MPEG) to generate the video data PIC.

Step ST46:

The MXF_MUX thread 44 sets the "Channel Status", "SamplingRate", "AuxSampleBits", and "WordLength" of the audio data SOU of the AES3 in the frame data FL_1 to FL_n shown in FIG. 5 based on the audio file attribute data AFPD and the attribute file data PF of the audio file data AF.

Step ST47:

The MXF_MUX thread 44 generates the audio data SOU based on the data set at step ST46 and the audio data AUDIO in the audio file data AF.

Step ST48:

The MXF_MUX thread 44 generates the frame data FLD_1 to FLD_n based on the system data SYS, the video data PIC, the audio data SOU generated at the steps ST43 to ST47, and newly generated data AUX. Further, the MXF_MUX thread 44 generates the data MXF_D comprised of the header data HEADER generated at step ST44, the generated frame data FLD_1 to FLD_n, and newly generated footer data FOOTER and writes it to the RAID 6.

In the present embodiment, the MXF_MUX thread 44 directly receives the video file data VF and the audio file data AF and performs the processing as shown in FIG. 20 to generate the data MXF_D, whereby it is not necessary to once drop the video file data VF and the audio file data AF as temporary files, so the conversion time can be shortened.

[Edit Processes 9a and 9b]

Figure 21:
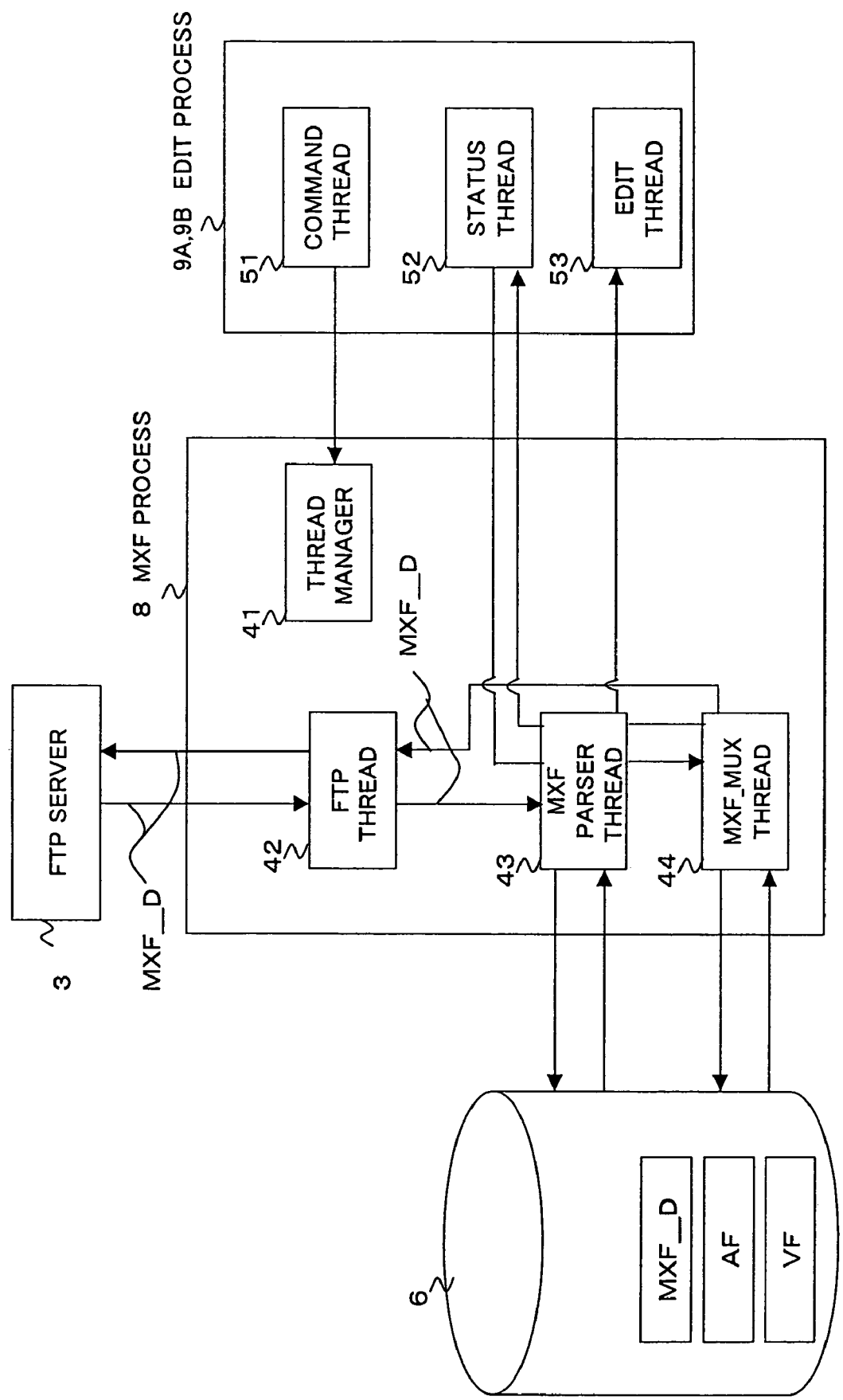
FIG. 21 is a view for explaining an edit process shown in FIG. 2.

FIG. 21 is a view for explaining the configurations of the edit processes 9a and 9b. As shown in FIG. 21, the edit processes 9a and 9b have for example a command thread 51, a status thread 52, and an edit thread 53. The command thread 51 outputs commands, for example, a parse command and the MXF command, in accordance with for example the operation signals from the operation units 12 and 13 shown in FIG. 3 and FIG. 4 to the thread manager 41 of the MXF process 8. The status thread 52 outputs designation information of the data MXF_D, the video file data VF, the audio file data AF, etc. as the object of the parse and MXF (for example address of URL etc.) and outputs the data such as the identification data and password of the user of the edit processes 9a and 9b to the MXF parser thread 43 and the MXF_MUX thread 44. The edit thread 53 performs the edit processing by using for example the video file data VF and the audio file data AF written by the MXF parser thread 43 to the RAID 6 and, according to need, the attribute file data PF.

Figure 22:
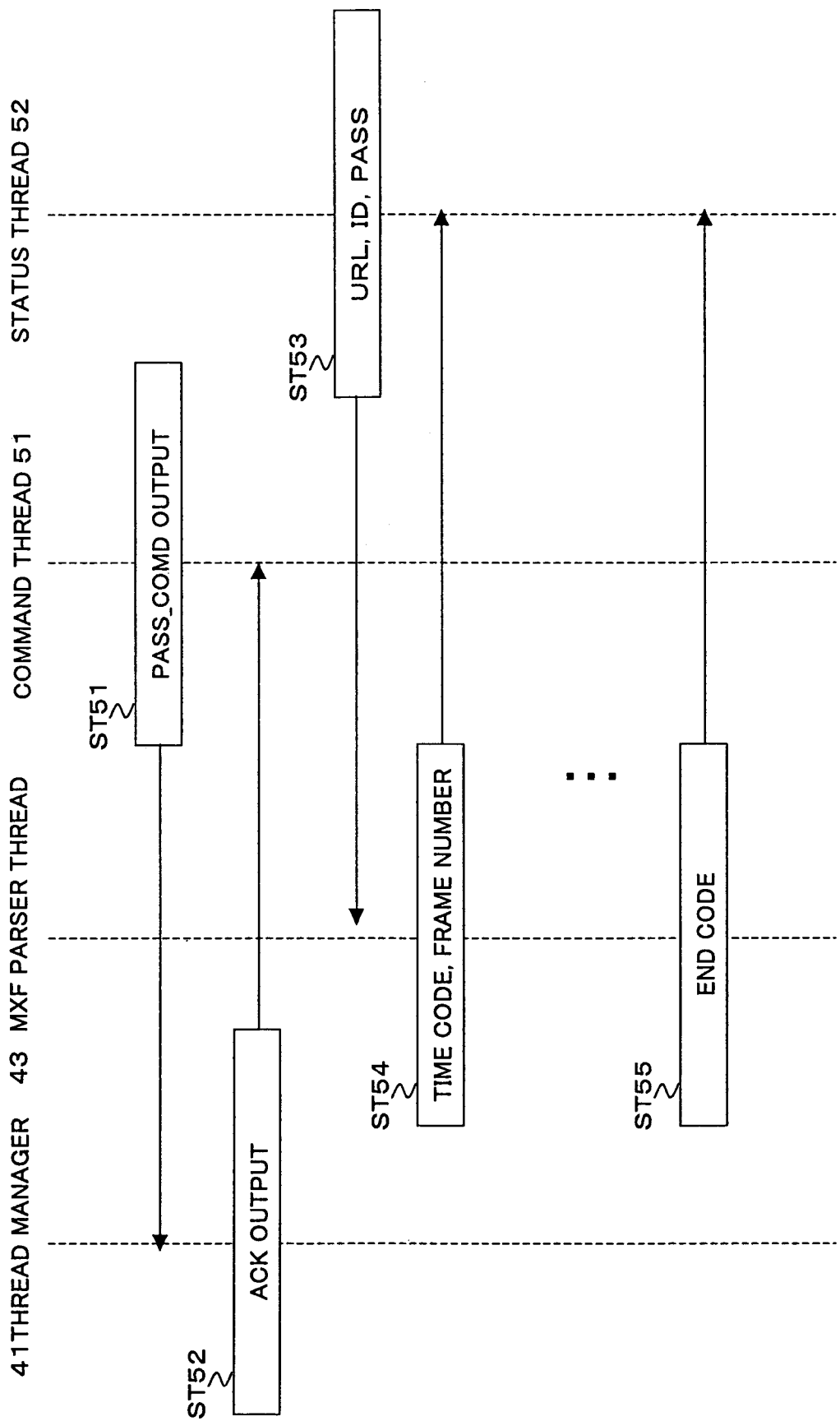
FIG. 22 is a view for explaining a request etc. transferred between the MXF process and the edit process when the MXF parser thread of the MXF process performs the parse processing in response to a request from the edit process shown in FIG. 2.

FIG. 22 is a view for explaining the request etc. transferred between the MXF process 8 and the edit processes 9a and 9b where the MXF parser thread 43 of the MXF process 8 performs the parse processing in response to requests from the edit processes 9a and 9b.

Step ST51:

The command thread 51 outputs for example the parse command PARSE COMD in accordance with the operation signals from the operation units 12 and 13 shown in FIG. 3 and FIG. 4 to the thread manager 41 of the MXF process 8. The thread manager 41 activates the MXF parser thread 43 in response to the parse command PARSE_COMD.

Step ST52:

The thread manager 41 outputs an acknowledgement ACK including an interface name (for example pipe name) used for the data transfer with the command thread 51 to the command thread 51. Thereafter, the transfer of the data and request between the thread manager 41 and the command thread 51 is carried out by designating the pipe name.

Step ST53:

The status thread 52 outputs designation information (for example the address of URL etc.) of the data MXF_D as the object of the parse and MXF, the identification data ID, password PASS, etc. of the user of the edit processes 9a and 9b to the MXF parser thread 43.

Step ST54:

The MXF parser thread 43 performs the parse processing mentioned before based on FIG. 13, FIG. 14, FIG. 18, and FIG. 19 with respect to the data MXF_D designated by the designation information received at step ST52 and writes the video file data VF, the audio file data AF, and the attribute file data PF generated by that to the RAID 6. The parse processing by the MXF parser thread 43 at step St54 may perform all processings of FIG. 13, FIG. 14, FIG. 18, and FIG. 19 too or may perform only the processing concerning the generation of the video data VIDEO and the audio data AUDIO. Then, the MXF parser thread 43 outputs the time code of the frame data FLD_1 to FLD_n terminating the parse processing and the frame number to the status thread 52 in accordance with the advance of the parse processing. The MXF parser thread 43 outputs the time code and the frame number to the status thread 52 whenever the parse processing of each frame data is completed until the parse processing for all frame data FLD_1 to FLD_n in the data MXF_D is completed.

Step ST55:

The MXF parser thread 43 outputs the end code to the status thread 52 when completing the parse processing for all frame data FLD_1 to FLD_n in the data MXF_D. For example, the edit process 9a on the computer 4 shown in FIG. 2(A) outputs the parse command PARSE_COMD designating the name of the data MXF_D and the names of the video file data VF and the audio file data AF with respect to the MXF process 8 on the computer 4 as shown in FIG. 22. By this, the MXF process 8 performs the parse processing of the data MXF_D while receiving as input the data MXF_D from the FTP thread 42 and writes the result to for example the RAID 6. In this case, the MXF process 8 and the edit process 9a are operating on the same computer 4, so the processing load of the MXF process 8 exerts an influence upon the processing of the edit process 9. Due to this, the edit process 9a issues a request for suspending the parse processing of the MXF process 8 to the MXF process 8 in accordance with the operation of the user. By this, the MXF process 8 interrupts the parse processing, and the computer 4 can concentrate on the processing of the edit process 9.

Figure 2B:
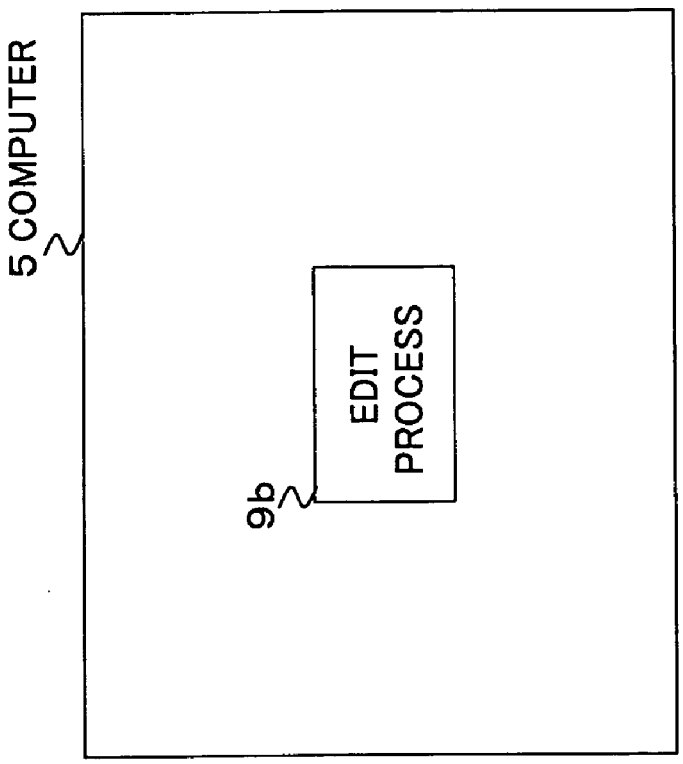
FIG. 2 is a view for explaining a process operating on computers 4 and 5 shown in FIG. 1.
Figure 2A:
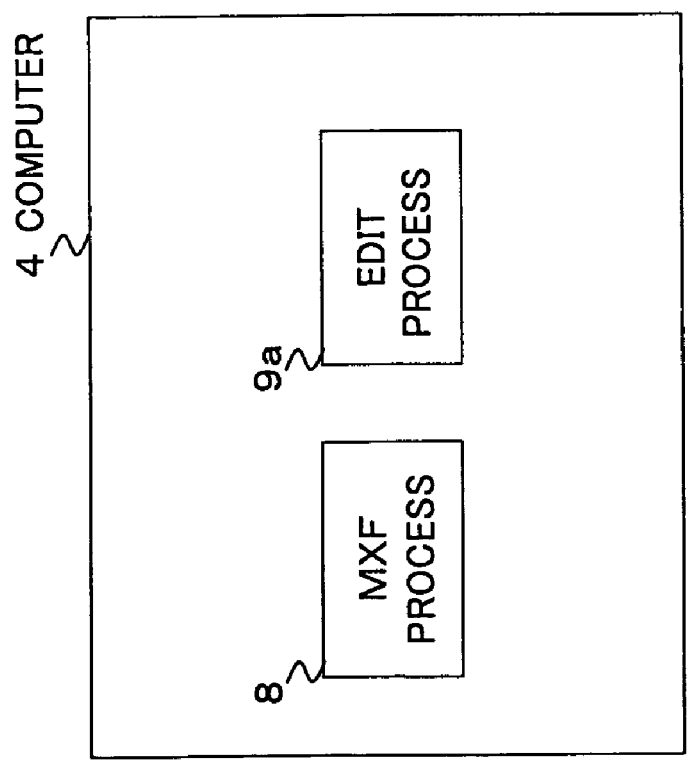
Figure 3:
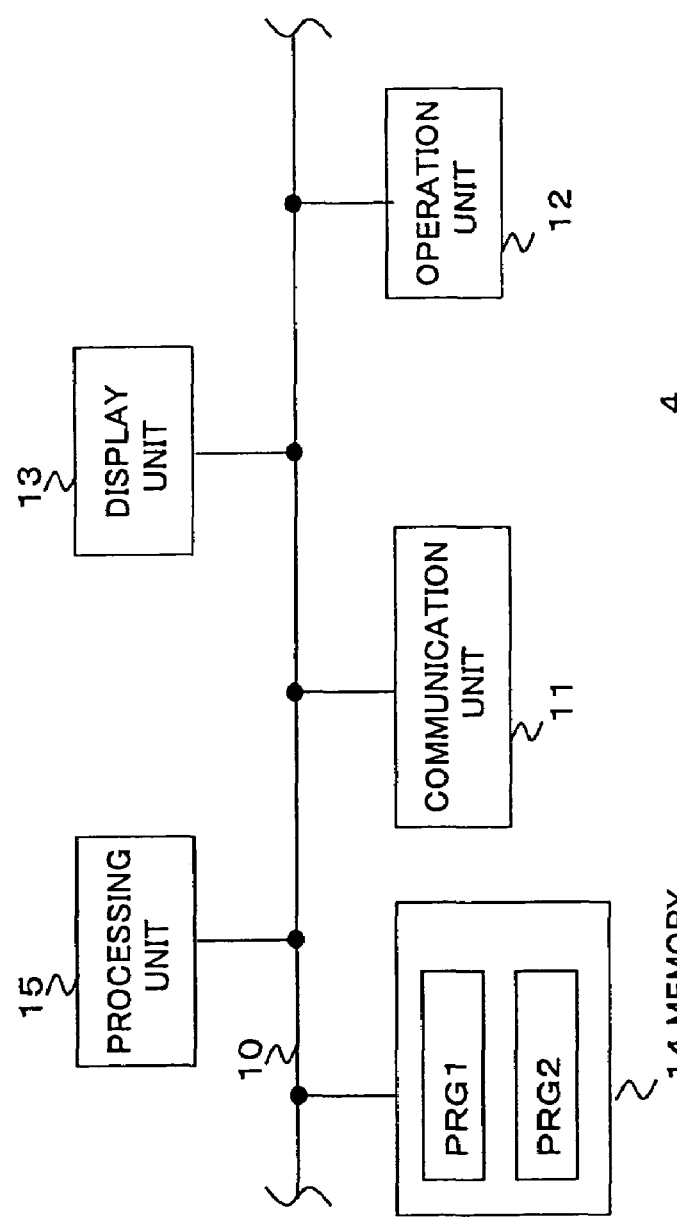
FIG. 3 is a view of the configuration of the computer 4 shown in FIG. 1.

On the other hand, the edit process 9b on the computer 5 shown in FIG. 2(B), as shown in FIG. 22, outputs the parse command PARSE_COMD designating the name of the data MXF_D and the names of the video file data VF and the audio file data AF to the MXF process 8 on the computer 4. By this, the MXF process 8 performs the parse processing of the data MXF_D while receiving as input the data MXF_D from the FTP thread 42 and writes the result to for example the RAID 6. In this case, since the MXF process 8 and the edit process 9a are operating on different computers 4 and 5, the processing load of the MXF process 8 will not exert an influence upon the processing of the edit process 9.

[Reproduction Process 80]

Figure 23:
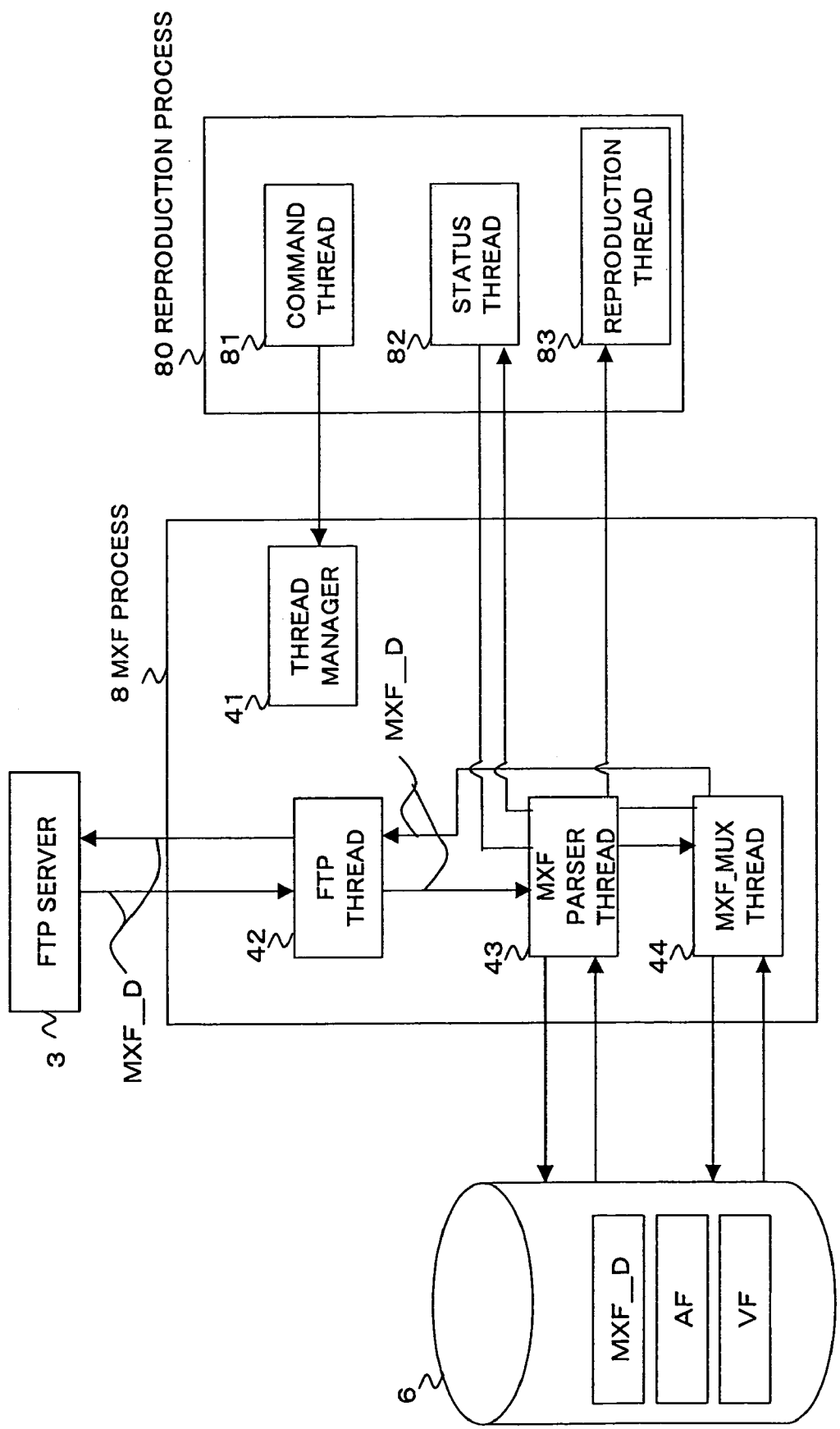
FIG. 23 is a view for explaining a reproduction process.
Figure 24:
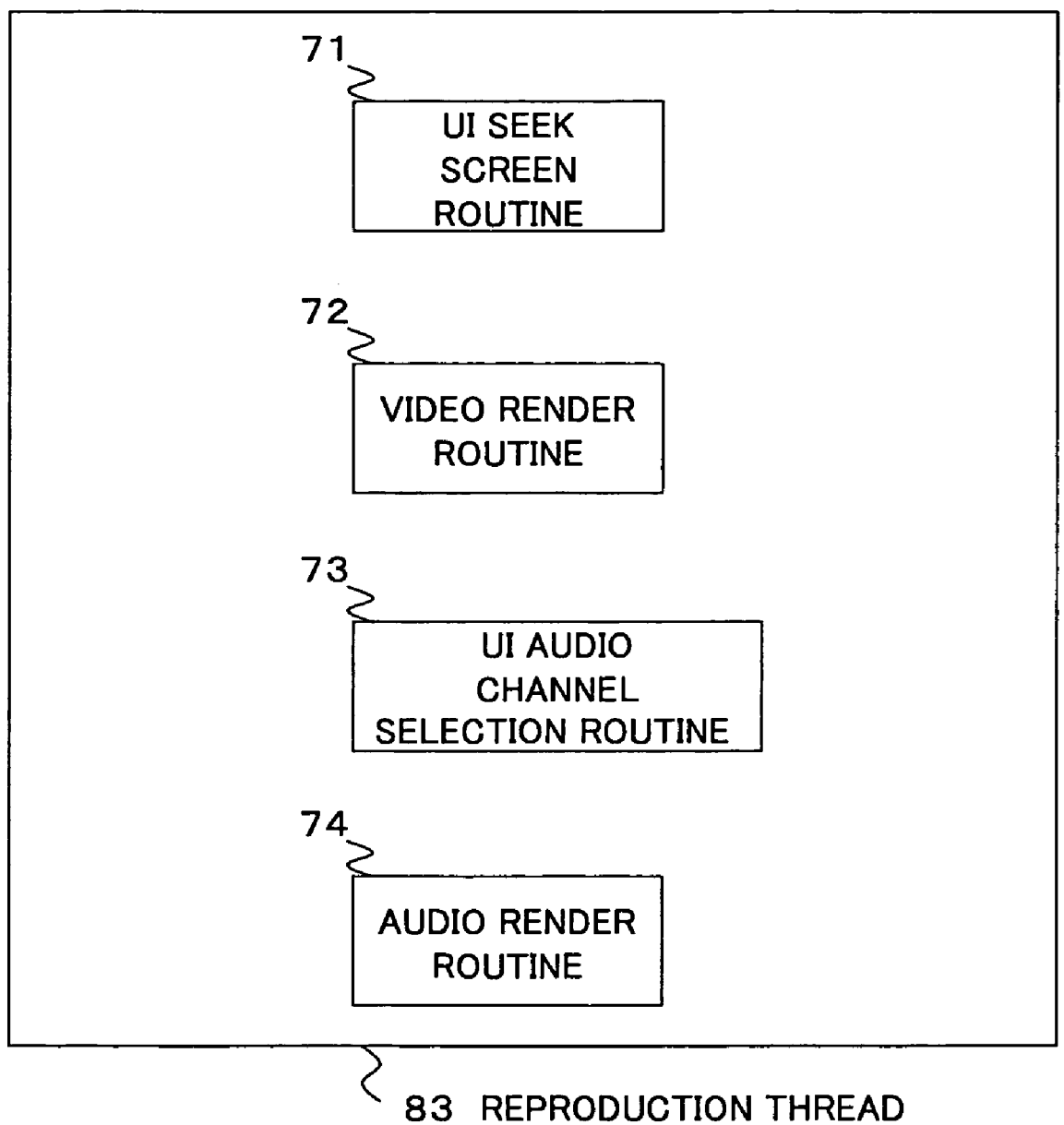
FIG. 24 is a view for explaining the reproduction thread shown in FIG. 23.
Figure 25:
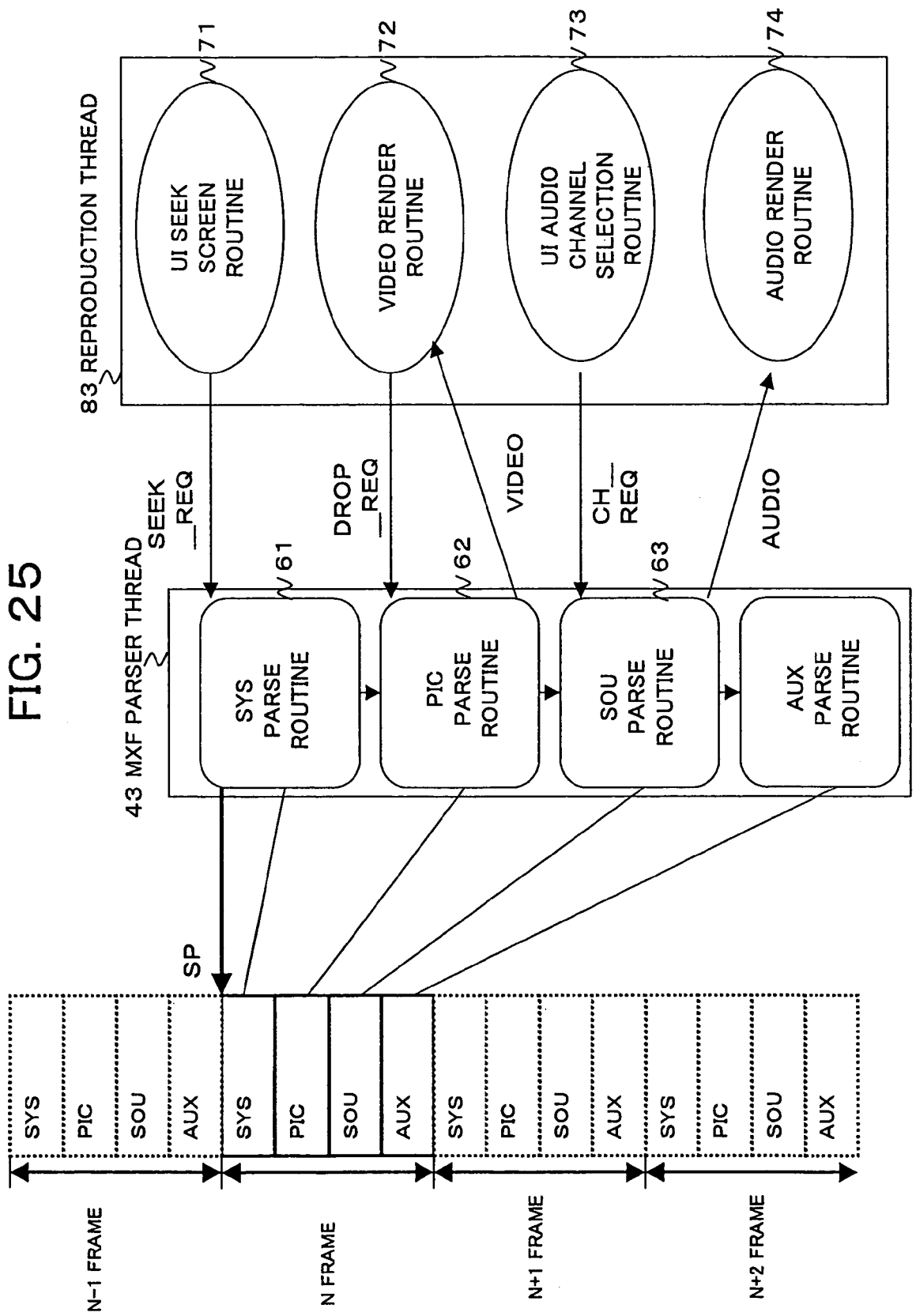
FIG. 25 is a view for explaining the processing of the reproduction thread and the MXF parser thread shown in FIG. 23.

The computer 4 or the computer 5 executes for example the predetermined reproduction program to activate the reproduction process 80 shown in FIG. 23. The reproduction process 80 has, for example, as shown in FIG. 23, a command thread 81, a status thread 82, and a reproduction thread 83. The reproduction thread 83 performs the processing for reproduction of the video data VIDEO and the audio data AUDIO input from the MXF parser thread 43 of the MXF process 8. FIG. 24 is a view of the configuration of the reproduction thread 83 shown in FIG. 23. As shown in FIG. 24, the reproduction thread 83 has for example an UI seek screen routine 71, a video render routine 72, an UI audio channel selection routine 73, and an audio data render routine 74. The UI seek screen,routine 71 displays an UI (User Interface) screen for outputting a seek request SEEK_REQ of the frame data to the SYS parse routine 61 on the display units 13 and 23 as shown in FIG. 25 in response to for example the operation signals from the operation units 12 and 22. The seek request SEEK_REQ is a request designating for example the frame data parsed by the MXF parser thread 43 of the MXF process 8 by for example the frame number.

The video render routine 72 performs the processing for reproduction of the video data VIDEO input from the PIC parse routine 62. By this, an image in accordance with the video data VIDEO is displayed on the display units 13 and 23. In this case, the video render routine 72 performs the synchronization processing with the audio render routine 74 so that for example the reproduced image and sound are synchronized. The video render routine 72 decides whether or not for example the previous reproduction processing time of the video data VIDEO corresponding to one frame data was longer than the time determined in advance as the time for reproducing one set of frame data. When deciding it is longer, as shown in FIG. 25, it outputs the drop request DROP_REQ to the PIC parse routine 62. Namely, the video render routine 72 outputs the drop request DROP_REQ to the PIC parse routine 62 when the processing for reproduction of normal speed or more of the video data VIDEO cannot be carried out due to the processing capability of the processing unit 15 shown in FIG. 3 or the processing unit 25 shown in FIG. 4. Due to this, a deviation of timing between the sound output and the image output and a deterioration of the image quality due to the delay of the processing for reproduction of the video data VIDEO by the processing units 15 and 25 can be prevented.

The UI audio channel selection routine 73 performs processing for selecting channels not to be reproduced in the reproduction thread 54 when the audio data of a plurality of channels prescribed by the AES3 are included in the audio data SOU of for example the frame data FLD_1 to FLD_n of the data MXF_D. The UI audio channel selection routine 73 outputs an unrequired channel designation request CH_REQ specifying the channels not to be reproduced designated by the user to the SOU parse routine 63.

The audio render routine 74 performs the processing for reproduction of the audio data AUDIO input from the SOU parse routine 63. By this, sound is output in accordance with the audio data AUDIO.

Below, an explanation will be given of the processing of the MXF parser thread 43 of the MXF process 8 of outputting the video data VIDEO and the audio data AUDIO to the reproduction thread 83 in response to commands from the edit processes. 9a and 9b or requests of the operation signals etc. from the operation unit 12 shown in FIG. 3. The MXF parser thread 43 is activated by the thread manager 41 in response to commands from the edit processes 9a and 9b or requests of the operation signals etc. from the operation unit 12 shown in FIG. 3 and performs the following processing. The processing of the MXF parser thread 43 shown below is carried out with respect to the data MXF_D input from the FTP thread 42 after passing for example the reception processing by the FTP thread 42 and is carried out in parallel with the reception processing by the FTP thread 42. Further, the processing of the MXF parser thread 43 shown below may be carried out with respect to the data MXF_D read out from the RAID 6 too. Note that the MXF parser thread 43 does not perform the processing of steps ST71 and ST72 when the processing of FIG. 26 is carried out with respect to the data MXF_D input from the FTP thread 42.

Figure 26:
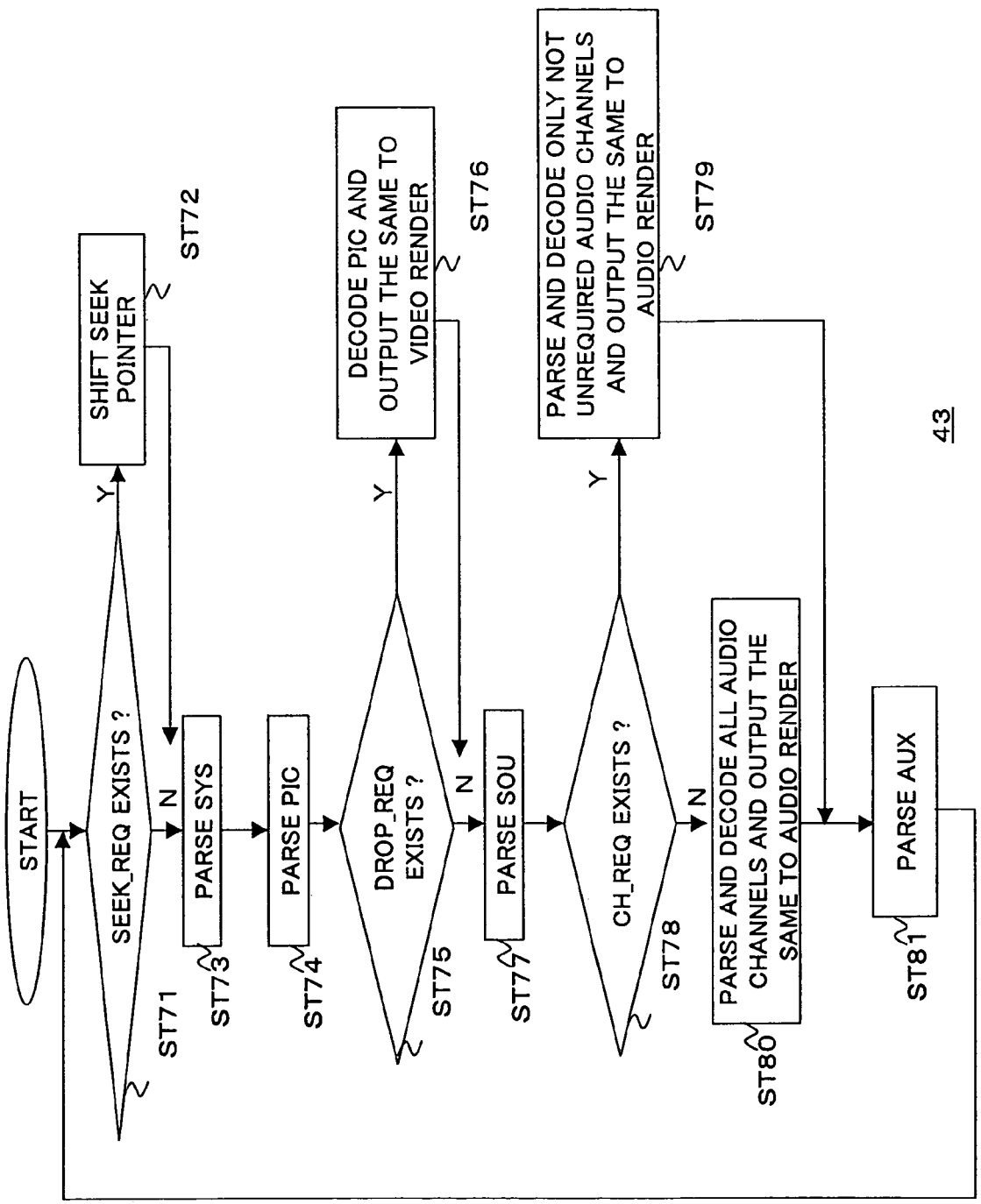
FIG. 26 is a view for explaining the processing of the MXF parser thread in the case shown in FIG. 25.

FIG. 26 is a flow chart for explaining the processing of the MXF parser thread 43 of the MXF process 8 of outputting the video data VIDEO and the audio data AUDIO to the reproduction thread 83. The MXF parser thread 43 sequentially performs the parse processings by the SYS parse routine 61, the PIC parse routine 62, the SOU parse routine 63, and the AUX parse routine for each of frame data FLD_1 to FLD_n shown in FIG. 5 when performing processing with the reproduction thread 83.

Step ST71:

The SYS parse routine 61 of the MXF parser thread 43 shown in FIG. 12 decides whether or not the seek request SEEK_REQ was input from the UI seek screen routine 71 of the reproduction thread 83 shown in FIG. 24. When deciding it was, the processing routine proceeds to step ST72, while where it not, the processing routine proceeds to step ST73.

Step ST72:

The parse routine 61 moves for example a seek pointer SP indicating the reading position (address) of the data MXF_D recorded in the RAID 6 to the address corresponding to the frame number indicated by the seek request SEEK_REQ received at step ST71. The seek pointer SP is updated to the address of the frame data to be read out next whenever the frame data of the data MXF_D is read out. In this way, by moving the seek pointer SP preceding the processings of the SYS parse routine 61, the PIC parse routine 62, and the SOU parse routine 63, the seek operation becomes possible without exerting an influence upon the processing of the PIC parse routine 62 and the SOU parse routine 63, and the configuration of the MXF parser thread 43 can be simplified.

Step ST73:

The SYS parse routine 61 reads out the system data SYS of the frame data FLD recorded at the address on the RAID 6 indicated by the seek pointer SP and performs the parse processing.

Step ST74:

The PIC parse routine 62 reads out the video data PIC continuing from the system data read out at step ST73 from the RAID 6 and performs the parse processing.

Step ST75:

The PIC parse routine 62 decides whether or not a drop request DROP_REQ was input from the video render routine 72. When deciding that the drop request was input, the processing routine proceeds to step ST76, while when not, the processing routine proceeds, to step ST77.

Step ST76:

The PIC parse routine 62 decodes the video data PIC read out at step ST74 by the decoding method corresponding to the coding method indicated by the system code SYS read out at step ST73 to generate the video data VIDEO and outputs this to the video render routine 72. Namely, when receiving the drop request DROP_REQ, by steps ST75 and ST76, the PIC parse routine 62 suspends the output of 1 frame's worth of the video data VIDEO to the video render routine 72. Note that, it is also possible to suspend the output of 2 frames' worth or more of the video data VIDEO.

Step ST77:

The SOU parse routine 63 reads out the audio data SOU continuing from the video data PIC read out at step ST74 and performs the parse processing.

Step ST78:

The SOU parse routine 63 decides whether or not the unrequired channel designation request CH_REQ was input from the UI audio channel selection routine 73. When deciding that it was input, the processing routine proceeds to step ST79, while when not, the processing routine proceeds to step ST80.

Step ST79:

The SOU parse routine 63 separates the audio data SOU read out at step ST77 to a plurality of channels of audio data AUDIO, selects and decodes the audio data AUDIO of the channels which are not designated by the unrequired channel designation request CH_REQ among them, and outputs the same to the audio render routine 74. In this case, the SOU parse routine 63 performs the decoding of the audio data AUDIO by the decoding method corresponding to the coding method indicated by the system code SYS read out at step ST73.

Step ST80:

The SOU parse routine 63 outputs all of the audio data AUDIO of the plurality of channels comprised of the audio data SOU read out at step ST77 to the audio render routine 74. Note that, in the processing shown in FIG. 26 mentioned above, the decision of step ST75 is carried out preceding step ST74. When receiving the drop request DROP_REQ, the parse processing of the video data PIC by step ST74 may not be carried out either.

FIG. 27 is a view for explaining the request etc. transferred between the MXF process 8 and the reproduction process 80 where the MXF parser thread 43 of the MXF process 8 performs the parse processing in response to the request from the reproduction process 80.

Step ST91:

The command thread 81 outputs for example the play command PLAY_COMD in response to for example the operation signals from the operation units 12 and 13 shown in FIG. 3 and FIG. 4 to the thread manager 41 of the MXF process 8. The thread manager 41 activates the MXF parser thread 43 in accordance with the play command PLAY_COMD.

Step ST92:

The thread manager 41 outputs an acknowledgement ACK including the name of the pipe as the interface used for the communication to the command thread 51 in response to the play command PLAY_COMD.

Step ST93:

The status thread 82 outputs the designation information of the data MXF_D as the object of the reproduction (for example address of URL etc.), the identification data ID, password PASS, etc. of the user of the reproduction process 80 to the MXF parser thread 43.

Step ST94:

The status thread 82 outputs the reproduction request R_REQ including the frame numbers of the frame data FLD_1 to FLD_n to be reproduced next to the MXF parser thread 43 in accordance with the progress of the reproduction processing.

Step ST95:

The MXF parser thread 43 performs the parse processing explained by using FIG. 25 and FIG. 26 with respect to the frame data FLD_1 to FLD_n of the frame numbers designated by the reproduction request R_REQ in response to the reproduction request R_REQ of step St94. Further, the time code of the frame data FLD_1 to FLD_n subjected to the parse processing by at least one routine among the SYS parse routine 61 of the MXF parser thread 43, the PIC parse routine 62, and the SOU parse routine 63, and the frame number are output to the status thread 82. The MXF parser thread 43 repeats the above processing until the parse processing for all frame data FLD_1 to FLD_n in the data MXF_D is completed.

Step ST96:

The status thread 82 outputs a play end request PLAY_END to the MXF parser thread 43.

Step ST97:

The MXF parser thread 43 terminates the parse processing in response to the play end request PLAY_END. Then, the MXF parser thread 43 outputs the end code to the status thread 82.

In this way, the MXF parser thread 43 has the function of receiving the play end request PLAY_END from the status thread 82 and thereby is able to give priority to the edit processing by the edit process 8a when the MXF process 8 and the edit process 9a are operating on the same computer like the computer 4 and able to efficiently perform the editing work.

Below, an explanation will be given of an example of the main operation of the editing system 1 according to the first to sixth aspects of the invention.

[Case Where Video File Data VF etc. is Generated from the Data MXF_D]

The MXF parser thread 43 of the MXF process 8 operating on the computer 4 generates the video file data VF comprised of the video attribute file data VFPD generated by the SYS parse routine 61 as mentioned above based on FIG. 13 and FIG. 14, and the video data VIDEO generated by the PIC parse routine 62 as mentioned above based on FIG. 18. Further, the MXF_MUX thread 44 generates the audio file data AF comprised of the audio attribute file data AFPD generated by the SYS parse routine 61, and the audio data AUDIO generated by the SOU parse routine 63 as mentioned above based on FIG. 19.

[Case Where the Data MXF_D is Generated from the Video File Data VF etc.]

The MXF_MUX thread 44 of the MXF process 8 operating on the computer 4 generates the data MXF_D from the video file data VF etc. by the processing shown in FIG. 20.

Below, an explanation will be given again of an example of the main operation of the editing system 1 according to the seventh to ninth aspects of the invention. The MXF process 8 operating on the computer 4, as shown in FIG. 11, prescribes the FTP thread 42 and the MXF parser thread 43 by the MXF process 8 and performs the reception processing by the FTP thread 42 and the parse processing by the MXF parser thread 43 in parallel. By this, the total time of the FTP reception time and the parse processing can be shortened. Further, the computer 4 activates the MXF parser thread 43 when the thread manager 41 performs the MXF parse processing, while activates the MXF_MUX thread 44 when performing the MUX processing, so the processing load of the processing unit 15 when not performing the MXF parse processing and the MUX processing can be reduced. The MXF parser thread 43 shown in FIG. 11 parses the data MXF_D shown in FIG. 5 storing, mixed together, a plurality of video data PIC, a plurality of audio data SOU, and the system data SYS by the SYS parse routine 61, the PIC parse routine 62, and the SOU parse routine 63 shown in FIG. 12 as explained by using FIG. 12 to FIG. 19. By this, the MXF parser thread 43 generates the video file attribute data VFPD shown in FIG. 7 concerning the video based on the parsed system data and metadata META and generates the video file data VF including the video file attribute data VFPD and the parsed plurality of video data PIC (VIDEO). Further, the MXF parser thread 43 generates the audio file attribute data AFPD shown in FIG. 9 concerning the audio based on the parsed system data and metadata META and generates the audio file data AF including the audio file attribute data AFPD and the parsed plurality of audio data SOU (AUDIO).

As explained above, according to the computer 4, the video file data VF shown in FIG. 7 and the audio file data AF shown in FIG. 9 can be automatically generated from the data MXF_D shown in FIG. 5. Further, according to the computer 4, the data MXF_D shown in FIG. 5 can be automatically generated from the video file data VF shown in FIG. 7 and the audio file data AF shown in FIG. 9.

Further, according to the computer 4, by converting the data MXF_D to the data which can be reproduced by the reproduction process 80 by the MXF parser thread 43, the reproduction processing by the reproduction process 80 based-on the data MXF_D becomes possible. Further, according to the computer 4, as shown in FIG. 11, by prescribing the FTP thread 42 and the MXF parser thread 43 by the MXF process 8 and performing the reception processing by the FTP thread 42 and the parse processing by the MXF parser thread 43 in parallel, the total time of the FTP reception time and the parse processing can be shortened. Further, according to the computer 4, the thread manager 41 activates the MXF parser thread 43 when performing the MXF parse processing, while activates the MXF_MUX thread 44 when performing the MUX processing, so the processing load of the processing unit 15 when not performing the MXF parse processing and the MUX processing can be reduced.

Further, according to the computer 4, by the MXF parser thread 43 performing the seek processing by receiving the seek request SEEK_REQ as shown in FIG. 25, the frame data to be reproduced by the reproduction thread 83 can be quickly MXF parse processed with a simple configuration. Further, according to the computer 4, by the MXF parser thread 43 performing the drop processing by receiving the drop request DROP_REQ, it becomes possible for the reproduction thread 83 to stably perform the normal speed reproduction. Further, according to the computer 4, the MXF parser thread 43 performs the parse processing of the SOU parse routine 63 for the unrequited channels based on the unrequired channel designation request CH REQ, so the processing load of the computer 4 can be reduced.

The present invention is not limited to the above embodiments. For example, in the above embodiments, the video file data VF and the audio file data AF were exemplified as the formats which could be processed by the edit processes 9a and 9b, but the format is not particularly limited so far as it is a format which can be processed on a general computer, and other than the above, a format such as RGB format or YUV format can be used too as the video data. Further, in the above embodiments, the data MXF_D was exemplified as the processed data of the present invention, but the present invention can use data other than the data MXF_D as the processing data too so far as it is data storing, mixed together, a plurality of audio data, and a plurality of first attribute data indicating attributes of the video data and the audio data.

According to the first to third aspects of the invention, a program capable of individually generating video file data and audio file data from data storing, mixed together, the video data, the audio data, and the attribute data, a method of the same, and a system of the same can be provided. According to the fourth to sixth aspects of the invention, a program capable of generating data storing, mixed together, the video data, the audio data, and the attribute data from the video file data and the audio file data, a method of the same, and a system of the same can be provided. Further, according to the seventh to ninth aspects of the invention, a program capable of shortening the processing time where the reception processed data is conversion processed, a method of the same, and a system of the same can be provided.

INDUSTRIAL CAPABILITY

The present invention can be applied to a system for converting the format of data concerning video data and audio data.

What we claim is:

1. A computer-readable medium for storing an executable program that when executed, said program causes a computer to perform an editing process, said program comprising:
   a first routine for parsing data to be processed, the data being mixed together, a plurality of video data, a plurality of audio data, and a plurality of first attribute data indicating attributes of the video data and audio data;
   a second routine for generating a second attribute data concerning the video data based on the first attribute data parsed by the first routine and generating a video file data including the second attribute data and the plurality of video data parsed by the first routine; and
   a third routine for generating a third attribute data concerning the audio data based on the first attribute data parsed by the first routine and generating audio file data including the third attribute data and the plurality of audio data parsed by the first routine, wherein each portion that is used to contain the second attribute data and the third attribute data in the generated video file and the generated audio file further comprises dummy data so that size of the portion becomes a predetermined value.

2. The program as set forth in claim 1, wherein:
said first routine detects said video data, said audio data, and said first attribute data based on an identification data when each of said video data, said audio data, and said first attribute data is formed by a plurality of a unit data each including the identification data for identifying said unit data and said data to be processed;
said second routine generates said video file data based on said video data and said first attribute data detected at said first routine; and
said third routine generates said audio file data based on said audio data and said first attribute data detected at said first routine.

3. The program as set forth in claim 1, wherein
said second routine specifies a format of said data to be processed based on said first attribute data and generates said video file data including said second attribute data corresponding to said specified format and previously defined; and
said third routine specifies a format of said processed data based on said first attribute data and generates said audio file data including said third attribute data corresponding to said specified format and previously defined.

4. The program as set forth in claim 1, wherein:
said second attribute data indicates at least one of a display size of an image corresponding to said video data, a data size of a frame of said image, and a reproduction rate of said video data; and
said third attribute data indicates at least one of a number of channels obtained by said audio data and a sampling rate of said audio data.

5. The program as set forth in claim 1, wherein:
said first routine further detects data length data when each of said unit data further includes data length data showing a data length of said data proper included in said unit data;
said second routine specifies a total data length of said plurality of video data included in said video file data based on said data length data detected related to said video data by said first routine and generates said video file data including said second attribute data indicating said total data length; and
said third routine specifies a total data length of said plurality of video data included in said audio file data based on said data length data detected related to said audio data by said first routine and generates said audio file data including said second attribute data indicating said total data length.

6. The program as set forth in claim 1, wherein:
each of said plurality of video data is one frame of video data;
each of said plurality of audio data is one frame of audio data; and
said first routine parses said processed data comprised of a plurality of module data each including a single unit of video data, said audio data reproduced along with said video data, and said first attribute data.

7. The program as set forth in claim 1, wherein:
said second routine counts the number of said module data parsed in said first routine and generates said video file data including said second attribute data further indicating the frame number data obtained based on said count; and said third routine generates said audio file data including said third attribute data further indicating said frame number data.

8. The program as set forth in claim 1, wherein:

said processed data further includes fourth attribute data indicating at least one of a compression method of said video data and audio data, a key word, title, identification data, edit content, preparation time, and edit time;

said first routine detects said fourth attribute data; and said program further includes a fourth routine for generating an attribute file data including data indicated by said first attribute data and said fourth attribute data detected by said first routine.

9. A data processing method comprising:

a first step of parsing data to be processed, the data being mixed together, a plurality of video data, a plurality of audio data, and a plurality of first attribute data indicating attributes of the video data and audio data;

a second step of generating a second attribute data concerning the video data based on the first attribute data parsed in the first step and generating a video file data including the second attribute data and the plurality of video data parsed in the first step; and a third step of generating a third attribute data concerning the audio data based on the first attribute data parsed in the first step and generating audio file data including the third attribute data and the plurality of audio data parsed in the first step, wherein each portion that is used to contain the second attribute data and the third attribute data in the generated video file and the generated audio file further comprises dummy data so that size of the portion becomes a predetermined value.

10. A data processing system comprising:

a first means for parsing data to be processed, the data being mixed together, a plurality of video data, a plurality of audio data, and a plurality of first attribute data indicating attributes of the video data and audio data;

a second means for generating a second attribute data concerning the video data based on the first attribute data parsed by the first means and generating video file data including the second attribute data and the plurality of video data parsed by the first means; and a third means for generating third attribute data concerning the audio based on the first attribute data parsed by the first means and generating audio file data including the third attribute data and the plurality of audio data parsed in the first means, wherein each portion that is used to contain the second attribute data and the third attribute data in the generated video file and the generated audio file further comprises dummy data so that size of the portion becomes a predetermined value.

* * * * *